(12) United States Patent
Meltzer et al.

(10) Patent No.: US 6,226,675 B1
(45) Date of Patent: *May 1, 2001

(54) PARTICIPANT SERVER WHICH PROCESS DOCUMENTS FOR COMMERCE IN TRADING PARTNER NETWORKS

(75) Inventors: Bart Alan Meltzer, Aptos; Andrew Everett Davidson, Boulder Creek; Matthew Daniel Fuchs, Los Gatos; Robert John Glushko, San Francisco; Kenneth Persson, Santa Cruz; Kelly Lane Schwarzhoff, Palo Alto, all of CA (US)

(73) Assignee: Commerce One, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/173,847

(22) Filed: Oct. 16, 1998

(51) Int. Cl.[7] .................................................. G06F 13/00
(52) U.S. Cl. ........................... 709/223; 707/513; 705/26; 709/230; 370/466
(58) Field of Search ............................... 705/26; 709/223, 709/230; 707/513; 370/466

(56) References Cited

U.S. PATENT DOCUMENTS

| | | | |
|---|---|---|---|
| 5,742,845 | * | 4/1998 | Wagner ................................. 710/11 |
| 6,012,098 | * | 1/2000 | Bayeh et al. ......................... 709/246 |

FOREIGN PATENT DOCUMENTS

| | | |
|---|---|---|
| 0 704 795 A1 | 4/1996 | (EP) . |
| WO 98/34179 | 6/1998 | (WO) . |

OTHER PUBLICATIONS

Dudeck, J., "Aspects of implementing and harmonizing healthcare communication standards", *Intl. Journal of Medical Informatics*, vol. 48, No. 1–3, Elsevier Publications, Feb. 1, 1998, pp. 163–171.

Kristensen, A., "Template resolution in XML/HTML", *Computer Networks and ISDN Systems*, vol. 30, No. 1–7, North Holland Publishing, Amsterdam, Apr. 1, 1998, pp. 239–249.

(List continued on next page.)

*Primary Examiner*—Kenneth R. Coulter
(74) *Attorney, Agent, or Firm*—Wilson Sonsini Goodrich & Rosati

(57) ABSTRACT

Participant servers in a network of customers, suppliers and other trading partners exchange machine readable documents. The participants in the network use self defining electronic documents, such as XML based documents, which can be easily understood amongst the partners. Definitions of the electronic business documents, called business interface definitions, are posted on the Internet, or otherwise communicated to members of the network. The business interface definitions tell potential trading partners the services the company offers and the documents to use when communicating with such services. Thus, a typical business interface definition allows a customer to place an order by submitting a purchase order or a supplier checks availability by downloading an inventory status report. Participants are programmed by the composition of the input and output documents, coupled with interpretation information in a common business library, to handle the transaction in a way which closely parallels the way in which paper based businesses operate.

49 Claims, 16 Drawing Sheets

OTHER PUBLICATIONS

Liechti, O. et al., "Structured graph format: XML metadata for describing Web site structure", *Computer Networks and ISDN Systems*, vol. 30, No. 1–7, North Holland Publishing, Amsterdam, Apr. 1, 1998, pp. 11–21.

"W3C: Extensible Markup Language (XML) 1.0—W3C Recommendation Feb. 10, 1998", http://www.w3.org/TR/1998/REC-xml-19980210, Printed from Internet Feb. 17, 1998, pp. 1–37.

Kimbrough, et al., "On Automated Message Processing in Electronic Commerce and Work Support Systems: Speech Act Theory and Expressive Felicity", ACM Transactions on Information Systems, Vo. 15, No. 4, Oct. 1997, pp. 321–367.

Fuchs, Matthew, "Domain Specific Languages for *ad hoc* Distributed Applications", USENIX Associate, Conference on Domain–Specific Languages, Oct. 15–17, 1997, pp. 27–35.

Finin, et al., "KQML as an Agent Communication Language", Association of Computing Machinery, 1994, pp. 456–463.

Tenenbaum, et al., "Eco System: An Internet Commerce Architecture", IEEE, May 1997, pp. 48–55.

"The Internet: Untangling the Web", *The Economist*, Apr. 25, 1998, p. 80 [no author].

\* cited by examiner

PARTICIPANT SERVER WHICH PROCESS DOCUMENTS FOR COMMERCE IN TRADING PARTNER NETWORKS

CROSS-REFERENCE TO RELATED APPLICATIONS

The present application is related to co-pending U.S. patent application Ser. No. 09/173,858, filed on Oct. 16, 1998, the same day as the present application, and having the same inventors, entitled DOCUMENTS FOR COMMERCE IN TRADING PARTNER NETWORKS AND INTERFACE DEFINITIONS BASED ON THE DOCUMENTS, still pending; and to co-pending U.S. patent application Ser. No. 09/173,854, filed on Oct. 16, 1998, the same day as the present application, and having the same inventors, entitled MARKET MAKERS USING DOCUMENTS FOR COMMERCE IN TRADING PARTNER NETWORKS, now U.S. Pat. No. 6,125,391.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates to systems and protocols supporting transactions among diverse clients coupled to a network; and more particularly to systems and protocols supporting commercial transactions among platforms having variant architectures.

2. Description of Related Art

The Internet and other communications networks provide avenues for communication among people and computer platforms which are being used for a wide variety of transactions, including commercial transactions in which participants buy and sell goods and services. Many efforts are underway to facilitate commercial transactions on the Internet. However, with many competing standards, in order to execute a transaction, the parties to the transaction must agree in advance on the protocols to be utilized, and often require custom integration of the platform architectures to support such transactions. Commercial processes internal to a particular node not compatible with agreed upon standards, may require substantial rework for integration with other nodes. Furthermore, as a company commits to one standard or the other, the company becomes locked-in to a given standardized group of transacting parties, to the exclusion of others.

A good overview of the challenges met by Internet commerce development is provided in Tenenbaum, et al., "*Eco System: An Internet Commerce Architecture*", Computer, May 1997, pp. 48–55.

To open commercial transactions on the Internet, standardization of architectural frameworks is desired. Platforms developed to support such commercial frameworks include IBM Commerce Point, Microsoft Internet Commerce Framework, Netscape ONE (Open Network Environment), Oracle NCA (Network Computing Architecture), and Sun/JAVASoft JECF (JAVA Electronic Commerce Framework). In addition to these proprietary frameworks, programming techniques, such as common distributed object model based on CORBA IIOP (Common Object Request Broker Architecture Internet ORB Protocol), are being pursued. Use of the common distributed object model is intended to simplify the migration of enterprise systems to systems which can inter-operate at the business application level for electronic commerce. However, a consumer or business using one framework is unable to execute transactions on a different framework. This limits the growth of electronic commerce systems.

Companies implementing one framework will have an application programming interface API which is different than the API's supporting other frameworks. Thus, it is very difficult for companies to access each others business services, without requiring adoption of common business system interfaces. The development of such business system interfaces at the API level requires significant cooperation amongst the parties which is often impractical.

Accordingly, it is desirable to provide a framework which facilitates interaction amongst diverse platforms in a communication network. Such system should facilitate spontaneous commerce between trading partners without custom integration or prior agreement on industry wide standards. Further, such systems should encourage incremental path to business automation, to eliminate much of the time, cost and risks of traditional systems integration.

Overall, it is desirable to provide an electronic commerce system that replaces the closed trading partner networks based on proprietary standards with open markets.

SUMMARY OF THE INVENTION

The present invention offers an infrastructure for connecting businesses with customers, suppliers and trading partners. Under the infrastructure of the present invention, companies exchange information and services using self-defining, machine-readable documents, such as XML (Extensible Markup Language) based documents, that can be easily understood amongst the partners. Documents which describe the documents to be exchanged, called business interface definitions BIDs herein, are posted on the Internet, or otherwise communicated to members of the network. The business interface definitions tell potential trading partners the services the company offers and the documents to use when communicating with such services. Thus, a typical business interface definition allows a customer to place an order by submitting a purchase order, compliant with a document definition published in the BID of a party to receive the purchase order. A supplier is allowed to check availability by downloading an inventory status report compliant with a document definition published in the BID of a business system managing inventory data. Use of predefined, machine-readable business documents provides a more intuitive and flexible way to access enterprise applications.

A node in the commerce network establishes an interface for transactions according to the present invention that comprises a machine-readable specification of an interface, along with a machine-readable data structure that includes interpretation information for the machine-readable specification of the interface. The machine-readable specification of the interface includes a definition of an input document and a definition of an output document, that are accepted and produced by transaction processes for which the node acts as an interface. The definitions of the input and output documents comprise respective descriptions of sets of storage units and logical structures for sets of storage units, such as according to a standard XML based document. The machine-readable data structure that includes interpretation information according to various aspects of the invention includes data type specifications (e.g. string, array, etc.) for logical structures in the definitions of the input and output documents, content models (e.g. lists of possible values) for logical structures and/or data structures that map predefined sets of storage units for a particular logic structure to respective entries in a list in order to provide a semantic definition of logical structures (e.g. mapping codes to product names).

According to other aspects of the invention, the interface includes a repository in memory accessible by at least one node in the network that stores a library of logic structures and interpretation information for the logic structures. The repository can be extended to include a library of definitions of input and output documents, a library of specifications of interfaces, and a library of specifications for participant interface nodes in the network.

Thus, a participant in the transaction framework of the present invention executes transactions amongst nodes in a network that includes a plurality of nodes executing processes involved in the transactions. The method includes storing a machine-readable specification of an interface for a transaction, the specification includes a definition of an input document and a definition of an output document. The definition of the input and output documents comprise respective descriptions of sets of storage units and logical structures for the sets of storage units. In a preferred system, the definitions are expressed in a manner compliant with a standard XML document type definition DTD, extended by semantic mapping, content modeling and data typing of some elements. The participant in the transaction receives data comprising a document through a communication network. The participant parses the document according to the specification stored for a transaction to identify an input document for the transaction. After parsing the document, at least a portion of the input document is provided in a machine-readable format to a transaction process which produces an output. An output document is formed comprising the output of the transaction process, based on the definition of an output document in the stored specification. The output document is transmitted on the communication network, typically back to the source of the input document, or elsewhere as suits the needs of a particular type of transaction.

Thus the business interface definition bridges the gap between the documents specified for example according to XML and the programs which execute on the front end of the transaction processing services at particular nodes. Such front ends are implemented for example by JAVA virtual machines, or by other common architectures providing for interconnection of systems across a network. The business interface definition provides a technique by which a transaction protocol is programmed using the business interface definition document. The program for the protocol of the transaction is established by a detailed formal specification of a document type.

The machine-readable specification of the interface of the transaction is made accessible to other platforms in the network. Participant platforms include resources to design input documents and output documents according to the transaction interface specified at a complementary node. Thus, participant nodes include resources to access the definition of an input document for the complementary interface and a definition of an output document for the complementary interface. The stored specification for the accessing participant node is established by including at least part of the definition of the output document of the complementary interface in the definition of the input document of the interface stored in the specification.

The process of establishing the stored specification of an interface according to another aspect of the invention includes accessing elements of the machine-readable specification from a repository. The repository stores a library of logic structures, content models, and schematic maps for logic structures, and definition of documents that comprise logic structures used to build interface description. A repository accessible in the network facilitates the building of interface descriptions which can be easily shared. Any differences between the input document created for a particular process and the output document expected as a return by a complementary process can be easily negotiated by communication on the network and agreeing on common logic structures to express particular information.

The machine-readable specification of an interface of a transaction according to one aspect of the invention includes a document compliant with a definition of an interface document that is shared amongst members of the network. A definition of the interface document includes logic structures for storing an identifier of a particular transaction and at least one of definitions and references to definitions of input and output documents for the particular transaction. That is, the interface description for a particular service may actually encompass a definition of the input and output documents. Alternatively, it may include pointers to a location in the repository, or elsewhere in the network, of such definitions.

According to another alternative of the invention, the machine-readable specification includes a business interface definition BID document compliant with a definition of an interface document that includes logical structures for storing an identifier of the interface, and for storing at least one of specifications and references to specifications of a set of one or more transactions supported by the interface. For each supported transaction, the document includes at least one of definitions and references to definitions of input and output documents for the particular transaction.

According to another aspect of the invention, the storage units defined in the definitions of the input and output document comprise parsed data including character data encoding text characters, and mark-up data identifying sets of storage units according to the logical structures of the input and output documents. According to another aspect of the invention, at least one of the sets of storage units encodes the plurality of text characters providing a natural language word. This facilitates the use of the definitions of input and output documents by human readers and developers of such documents.

According to another aspect of the invention, the specification of the input and output documents includes interpretation information for at least one of the sets of storage units identified by the logical structure. The interpretation information in one example encodes definitions for sets of parsed characters. In another example, the interpretation information provides for content model specifications, such as requiring a specific logic structure to carry a member of a list of codes mapped to product descriptions in a catalog. In some systems, the storage units in a logic structure of a document may include sets of unparsed data, as suits the needs of a particular implementation.

According to yet another aspect of the invention, the transaction process in a particular platform has a transaction processing architecture which is one of a plurality of variant transaction processing architectures. Thus the participant node includes resources for translating at least a portion of the input document into a format readable according to the variant transaction processing architecture of the transaction process utilizing the information. The elements of the document definition are translated into programming objects that include variables and methods according to the variant transaction processing architectures of the transaction process. For a participant having a JAVA virtual machine acting as a transaction process front end, particular fields in the documents are translated into JAVA objects, including the data as well as get and set functions associated with a JAVA object. Other transaction processing architectures supportable according to the present invention include processes compliant with an interface description language in the sense of Common Object Request Broker Architecture CORBA, Component Object Model COM, On-Line Transaction Processing OLTP, and Electronic Data Interchange EDI.

According to other aspects of the invention, a repository is provided that stores document types for use in the plurality of transactions. The machine-readable specification for a particular transaction defines at least one of the input and output documents by reference to a document type in the repository. According to another aspect, the document type included in the repository include a document type for identifying participants in the network. Such document type providing structures for identifying a participant, specifying the services supported by the participant, and specifying the input and output documents for each of such services.

In addition to the methods described above, the present invention provides an apparatus for managing transactions among nodes that includes a network interface, memory for storing data and programs of instructions including a machine-readable specification of an interface for a transaction as described above, and a data processor that is coupled with the memory and the network interface. The programs of instructions stored in the apparatus include logic to execute the processes described above for a participant in the transactions.

The present invention further provides an apparatus for establishing participant interfaces for transactions executed on a system that include a network interface and a data processing resources that execute transaction processes according to a transaction processing architecture. The apparatus includes programs of instructions that are executable by the system and stored on a medium accessible by the system that provide tools to build a definition of a participant interface for a participant in a particular transaction. The definition of a participant interface includes a definition of an input document and a definition of an output document. The definitions of the input and output documents comprise respective machine-readable descriptions of sets of storage units in logical structures for the sets of storage units, which may be compliant in one aspect of the invention with XML document type definitions.

The apparatus for establishing participant interfaces according to this aspect of the invention also includes programs of instructions stored on a medium accessible by the data processing system and responsive to the definitions of input and output documents to compile data structures corresponding to the sets of storage units and logical structures of the input and output documents that are compliant with the transaction processing architecture, to compile instructions executable by the system to translate the input document to the corresponding data structures, and to compile instructions executable by the system to translate output of the transaction processes into sets of storage units and logical structures of the output document.

The tools to build a definition of a participant interface in a preferred system include instructions executable by the system to access elements of the definition from complementary nodes and/or from a repository that stores a library of logical structures and interpretation information for logical structures used to build interface descriptions. According to various aspects of the invention, the repository includes not only a library of logical structures but definitions of documents that comprise logical structures, and formats for specifying participant interfaces. According to this aspect of the invention, tools are provided for building specifications of business interfaces according to the techniques described above in connection with the description of the participant nodes. The tools for building interfaces and the tools for compiling the interfaces into resources needed for communication with transaction processing architectures according to this aspect of the invention, are implemented in participant nodes in the preferred system, and utilized for the development and optimization of the interface descriptions as use of the network grows based on interface descriptions that define input and output documents.

Accordingly, another aspect of the invention provides an apparatus that includes memory and a data processor that executes instructions stored in the memory that include tools to build a definition of a participant interface and a compiler performing the functions described above.

According to yet another aspect of the invention, the use of the participant interface descriptions enables the operation of a market maker node. At such a node, a method for managing transactions is provided that comprises storing machine-readable specifications of a plurality of participant interfaces which identify transactions supported by the interfaces, and the respective input and output documents of such transactions. As described above, the definitions of the input and output documents comprise respective descriptions of sets of storage units and logical structures for the sets of storage units, such as according to the XML standard. In addition, the definitions of the transactions and the definitions of the participant interfaces all comprise documents specified according to a technique compliant with XML or other standardized document expression language. At such market maker node, data comprising a document is received over a communication network. The document is parsed according to the specifications to identify an input document in one or more transactions which accept the identified input document. At least a portion of the input document is provided in a machine-readable format to a transaction process associated with the one or more identified transactions. The step of providing at least a portion of the input document to a transaction process includes executing a routing process according to a processing architecture at the market maker node. The routing process in one aspect of the invention is executed according to a particular processing architecture, and at least a portion of the incoming document is translated into the format of the processing architecture of the routing process. The translating according to the preferred aspect includes producing programming objects that include variables and methods according to the processing architecture of the routing process.

According to another aspect of the invention, the market maker node also supports the repository structure. Thus, a process is included at the market maker node for allowing access by participants in the network to a repository stored at the market maker node. As described above, the repository includes definitions of logic structures, interpretation information, and document definitions for use by the participant nodes to build transaction interface documents and includes instances of business interface definitions that identify the participants, and the transactions executed by the respective participants.

The routing process includes according to various alternatives the translating of the input document into the variant processing architecture of the processes to which the document is to be routed, or routing the input document in its original document format across the network to a remote processing node, or to combinations of such processes. In alternatives, the routing process may also include techniques for transforming an input document defined according to one input document definition into a different document defined according to a different document specification for a process which has registered to watch for the input document.

Also, the market maker node is provided according to the present invention as apparatus that includes a network interface, memory storing data and programs of instructions including the specifications of the participant interfaces, and a data processor. The logic is provided with the data processor in the form of programs of instructions or otherwise to perform the market maker process as discussed above.

Accordingly, the present invention provides a foundation for electronic commerce based on the sharing of specifications of input and output documents. Documents provide an intuitive and flexible way to access business services, much simpler to implement than programming APIs. It is much easier to interconnect companies in terms of documents that are exchanged, on which such companies already largely agree, than in terms of business system interfaces which invariably differ. In addition, such documents are specified in a human readable format in the preferred embodiment. According to the present invention the business interfaces are specified in documents, such as XML documents that are readily interpretable by humans as well as by computers.

Utilization of the document based transaction architecture of the present invention involves the use of a parser which operates in basically the same way for any source of documents, eliminating much of the need for custom programs to extract and integrate information from each participant in the network. Thus, integrating enterprise information from accounting, purchasing, manufacturing, shipping and other functions can be accomplished by first converting each source to a document having an architecture according to the present invention, and then processing the parsed data stream. Each node in the system that participates in the market only needs to know about the format of its internal systems, as well as the format of the documents being specified for interchange according to the transaction. Thus, there is no need to be able to produce the native format of every other node which might want to participate in the electronic commerce network.

For complete business integration, the present invention provides a repository of standardized logical structures, like XML elements, attributes or meta data, establishing a semantic language for particular commerce communities, a means for mapping between different meta data descriptions, and a server for processing the documents and invoking appropriate applications and services. The basic building blocks of a network according to the present invention include the business interface definitions which tell potential trading partners what online services a company offers and which documents to use to invoke the services; and servers which provide the bridge to bind together the set of internal and external business services to create a trading community. The server operates to parse the incoming documents and invoke the appropriate services. Also the server according to the present invention handles the translation tasks from the format of the documents being received and transmitted, to and from the formats of the respective host systems. Thus, trading partners need only agree on the structure, content and sequencing of the business documents exchanged, and not on the details of application programmer interfaces. How a document is processed and the actions which result from receipt of a document are strictly up to the businesses providing the services. This elevates integration from the system level to the business level. It enables the business to present a clean and stable interface to its partners despite changes in its internal technology implementation, organization or processes.

The whole process of building business interface definitions and enabling servers to manage commerce according to such descriptions is facilitated by a common business library, or repository, of information models for generic business concepts including business description primitives like companies, services and products, business forms like catalogs, purchase orders and invoices, and standard measurements, including time and date, location and classification of goods.

Other aspects of the present invention can be seen upon review of the figures, the detailed description, and the claims which follow.

DETAILED DESCRIPTION

Figure 1:
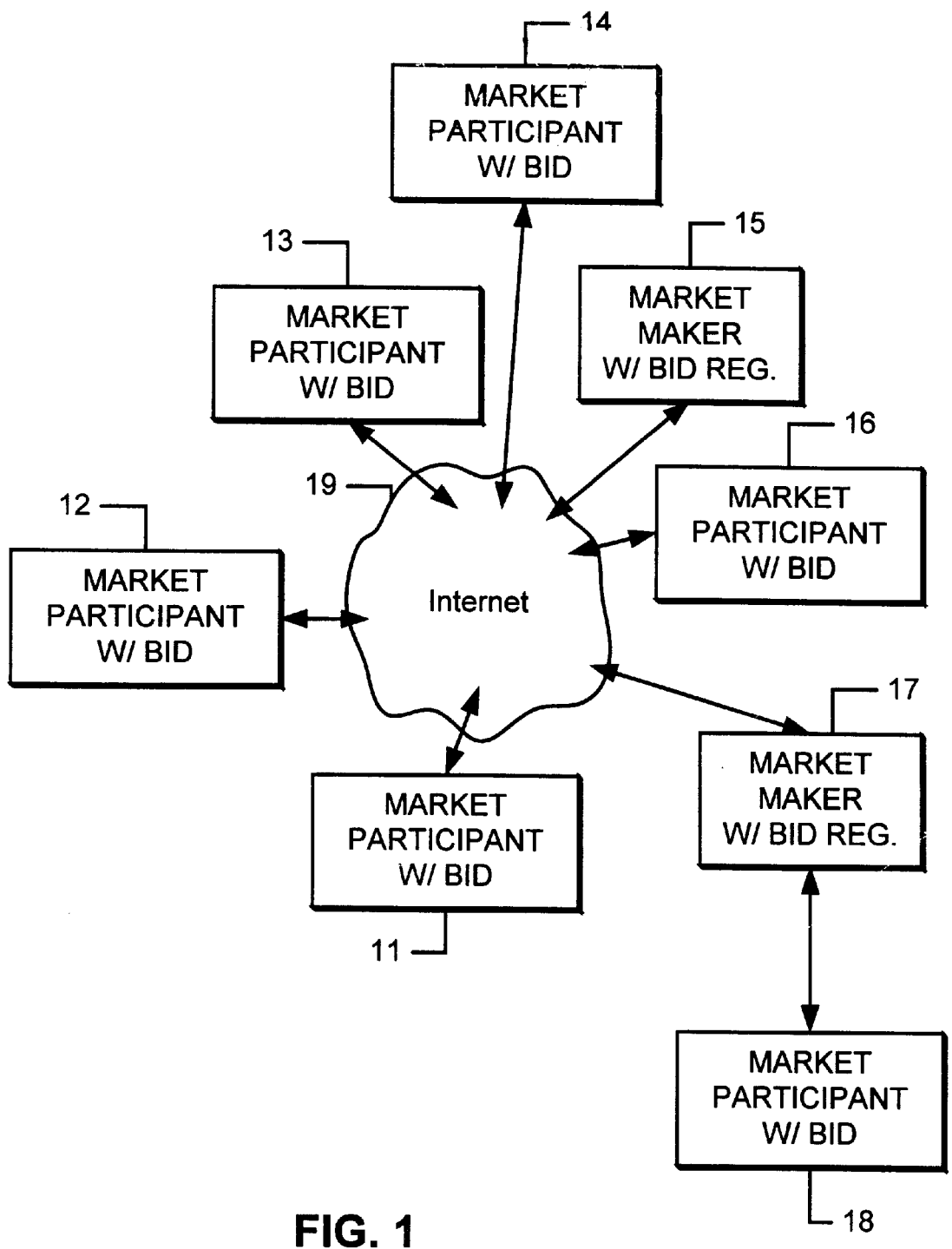
FIG. 1 is a simplified diagram of an electronic commerce network including business interface definitions BIDs according to the present invention.

A detailed description of the present invention is provided with respect to the figures, in which FIG. 1 illustrates a network of market participants and market makers based on the use of business interface definitions, and supporting the trading of input and output documents specified according to such interface descriptions. The network includes a plurality of nodes 11–18 which are interconnected through a communication network such as the Internet 19, or other telecommunications or data communications network. Each of the nodes 11–19 consists of a computer, such as a portable computer, a desktop personal computer, a workstation, a network of systems, or other data processing resources. The nodes include memory for storing the business interface definition, processors that execute transaction processes supporting commercial transactions with other nodes in the network, and computer programs which are executed by the processors in support of such services. In addition each of the nodes includes a network interface for providing for communication across the Internet 19, or the other communication network.

In the environment of FIG. 1, nodes 11, 12, 13, 14, 16 and 18 are designated market participants. Market participants include resources for consumers or suppliers of goods or services to be traded according to commercial transactions established according to the present invention.

In this example, nodes 15 and 17 are market maker nodes. The market maker nodes include resources for registering business interface definitions, called a BID registry. Participants are able to send documents to a market maker node, at which the document is identified and routed to an appropriate participant which has registered to receive such documents as input. The market maker also facilitates the commercial network by maintaining a repository of standard forms making up a common business library for use in building business interface definitions.

In this example, the market participant 18 is connected directly to the market maker 17, rather than through the Internet 19. This connection directly to the market maker illustrates that the configuration of the networks supporting commercial transactions can be very diverse, incorporating public networks such as the Internet 19, and private connections such as a local area network or a Point-to-Point connection as illustrated between nodes 17 and 18. Actual communication networks are quite diverse and suitable for use to establish commercial transaction networks according to the present invention.

Figure 2:
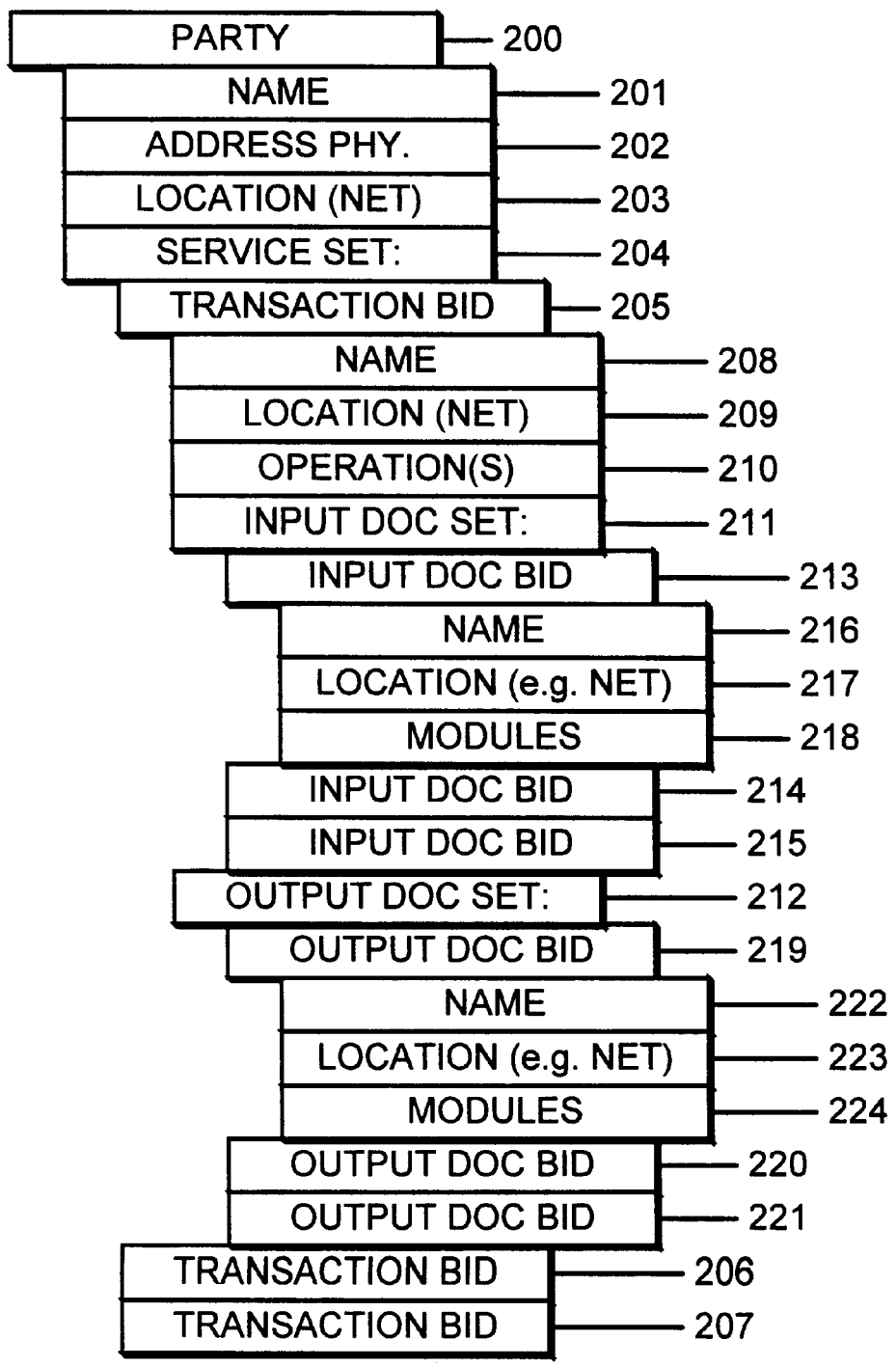
FIG. 2 is a simplified diagram of a business interface definition document according to the present invention.

FIG. 2 is a heuristic diagram of nested structures in a business interface definition BID which is established for market participants in the network according to the present invention. The business interface definition illustrated in FIG. 2 is a data structure that consists of logic structures and storage units arranged according to a formal definition of a document structure, such as a XML document type definition DTD. The structure of FIG. 2 includes a first logic structure 200 for identifying a party. Associated with the logic structure 200 are nested logic structures for carrying the name 201, the physical address 202, the network address or location 203, and a set of transactions for a service 204.

For each transaction in the service set, an interface definition is provided, including the transaction BID 205, the transaction BID 206, and the transaction BID 207. Within each transaction BID, such as transaction BID 205, logical structures are provided for including a name 208, a location on the network at which the service is performed 209, the operations performed by the service 210, and a set of input documents indicated by the tag 211. Also, the service BID 205 includes a set of output documents indicated by the tag 212. The set of input documents 211 includes a business interface definition for each input document for which the services are designed to respond, including input document business interface definitions 213, 214, and 215. Each business interface definition for an input document includes a name 216, a location on the network at which a description of the document can be found 217, and the modules to be carried in the document as indicated by the field 218. In a similar manner, the output document set 212 includes interface definitions for output documents including the output document BID 219, output document BID 220, and output document BID 221. For each output document BID, a name 222, a location on the network or elsewhere 223, and the modules of the document 224 are specified. The business interface definition for the participant as illustrated in FIG. 2 includes actual definitions of a logic structures to be utilized for the input and output documents of the respective services, or pointers or other references to locations at which these definitions can be found.

In the preferred system, the document of FIG. 2 is specified in an XML document type definition DTD, although other document definition architectures could be used, and includes interpretation information for the logical structures used in interpretation of instances of the documents. In addition, each of the transaction BIDs, input document BIDs and output document BIDs are specified according to an XML document type definitions. The XML type document is an example of a system based on parsed data that includes mark-up data and character data. Mark-up data identifies logical structures within the document and sets of character data identify the content of the logical structures. In addition, unparsed data can be carried in the document for a variety of purposes. See for example the specification of the *Extensible Mark-up Language XML* 1.0 REC-XML-19980210 published by the WC3 XML Working Group at WWW.W3.ORG/TR/1998/REC-XML-19980210.

Thus in an exemplary system, participant nodes in the network establish virtual enterprises by interconnecting business systems and services with XML encoded documents that businesses accept and generate. For example, the business interface definition of a particular service establishes that if a document matching the BID of a request for a catalog entry is received, then a document matching a BID of a catalog entry will be returned. Also, if a document matching the BID of a purchase order is received, and it is acceptable to the receiving terminal, a document matching the BID of an invoice will be returned. The nodes in the network process the XML documents before they enter the local business system, which is established according to the variant transaction processing architecture of any given system in the network. Thus, the system unpacks sets of related documents, such as MIME-encoded sets of XML documents, parses them to create a stream of "mark-up messages". The messages are routed to the appropriate applications and services using for example an event listener model like that described below.

The documents exchanged between business services are encoded using an XML language built from a repository of building blocks (a common business language) from which more complex document definitions may be created. The repository stores modules of interpretation information that are focused on the functions and information common to business domains, including business description primitives like companies, services and products; business forms like catalogs, purchase orders and invoices; standard measurements, like time, date, location; classification codes and the like providing interpretation information for logical structures in the XML documents.

The business interface definition is a higher level document that acts as a schema used for designing interfaces that trade documents according to the present invention. Thus the business interface definition bridges the gap between the documents specified according to XML and the programs which execute on the front end of the transaction processing services at particular nodes. Such front ends are implemented by JAVA virtual machines, or by other common architectures providing for interconnection of systems across a network. Thus, the business interface definition provides a technique by which a transaction protocol is programmed using the business interface definition document. The program for the protocol of the transaction is established by a detailed formal specification of a document type.

An example business interface definition BID based on a market participant document which conforms to an XML format is provided below. The market participant DTD groups business information about market participants, associating contact and address information with a description of services and financial information. This business information is composed of names, codes, addresses, a dedicated taxonomic mechanism for describing business organization, and a pointer to terms of business. In addition, the services identified by the market participant DTD will specify the input and output documents which that participant is expected respond to and produce. Thus, documents which define schema using an exemplary common business language for a market participant DTD, a service DTD, and a transaction document DTD specified in XML with explanatory comments follow:

Market Participant Sample

```
<!DOCTYPE SCHEMA SYSTEM "bidl.dtd">
<SCHEMA>
<H1>Market Participant Sample BID</H1>
<META
WHO.OWNS="Veo Systems"      WHO.COPYRIGHT="VeoSystems"
WHEN.COPYRIGHT="1998"       DESCRIPTION="Sample BID"
WHO.CREATED="*"             WHEN.CREATED="*"
WHAT.VERSION="*"            WHO.MODIFIED="*"
WHEN.MODIFIED="*"           WHEN.EFFECTIVE="*"
WHEN.EXPIRES="*"            WHO.EFFECTIVE="*"
WHO.EXPIRES="*">
</META>
```

<PROLOG>
<XMLDECL STANDALONE="no"></XMLDECL>
<DOCTYPE NAME="market.participant">
<SYSTEM>markpart.dtd</SYSTEM></DOCTYPE>
<PROLOG>
<DTD NAME="markpart.dtd">
<H2>Market Participant</H2>
<H3>Market Participant</H3>
<ELEMENTTYPE NAME="market.participant">
<EXPLAIN><TITLE>A Market Participant</TITLE>
<SYNOPSIS>A business or person and its service interfaces.</SYNOPSIS>
<P>A market participant is a document definition that is created to describe a business and at least one person with an email address, and it presents a set of pointers to service interfaces located on the network. In this example, the pointers have been resolved and the complete BID is presented here.</P></EXPLAIN>
<MODEL><CHOICE>
<ELEMENT NAME="business"></ELEMENT>
<ELEMENT NAME="person"></ELEMENT>
</CHOICE></MODEL></ELEMENTTYPE>
<H3>Party Prototype</H3>
<PROTOTYPE NAME="party">
<EXPLAIN><TITLE>The Party Prototype</TITLE></EXPLAIN>
<MODEL><SEQUENCE>
<ELEMENT NAME="party.name" OCCURS="+"></ELEMENT>
<ELEMENT NAME="address.set"></ELEMENT>
</SEQUENCE></MODEL>
</PROTOTYPE>
<H3>Party Types</H3>
<ELEMENTTYPE NAME="business">
<EXPLAIN><TITLE>A Business</TITLE>
<SYNOPSIS>A business (party) with a business number attribute.<SYNOPSIS>
<P>This element inherits the content model of the party prototype and adds a business number attribute, which serves as a key for database lookup. The business number may be used as a cross-reference to/from customer id, credit limits, contacts lists, etc.</P></EXPLAIN>
<EXTENDS HREF="party">
<ATTDEF NAME="business.number"><REQUIRED></REQUIRED></ATTDEF>
</EXTENDS>
</ELEMENTTYPE>
<H3>Person Name</H3>
<ELEMENTTYPE NAME="person">
<EXPLAIN><TITLE>A Person</TITLE></EXPLAIN>
<EXTENDS HREF="party">
<ATTDEF NAME="SSN"><IMPLIED></IMPLIED></ATTDEF>
</EXTENDS>
</ELEMENTTYPE>
<H3>Party Name</H3>
<ELEMENTTYPE NAME="party.name">
<EXPLAIN><TITLE>A Party's Name</TITLE>
<SYNOPSIS>A party's name in a string of character.</SYNOPSIS></EXPLAIN>
<MODEL><STRING></STRING></MODEL>
</ELEMENTTYPE>
<H3>Address Set</H3>
<ELEMENTTYPE NAME="address.set">
<MODEL><SEQUENCE>
<ELEMENT NAME="address.physical"></ELEMENT>

```
<ELEMENT NAME="telephone" OCCURS="*"></ELEMENT>
<ELEMENT NAME="fax" OCCURS="*"></ELEMENT>
<ELEMENT NAME="email" OCCURS="*"></ELEMENT>
<ELEMENT NAME="internet" OCCURS="*"></ELEMENT>
</SEQUENCE></MODEL>
</ELEMENTTYPE>
<H3>Physical Address</H3>
<ELEMENTTYPE NAME="address.physical">
<EXPLAIN><TITLE>Physical Address</TITLE>
<SYNOPSIS>The street address, city, state, and zip code.</SYNOPSIS></EXPLAIN>
<MODEL><SEQUENCE>
<ELEMENT NAME="street"></ELEMENT>
<ELEMENT NAME="city"></ELEMENT>
<ELEMENT NAME="state">/ELEMENT>
<ELEMENT NAME="postcode" OCCURS="?"></ELEMENT>
<ELEMENT NAME="country"></ELEMENT>
</SEQUENCE></MODEL>
</ELEMENTTYPE>
<H3>Street</H3>
<ELEMENTTYPE NAME="street">
<EXPLAIN><TITLE>Street Address</TITLE>
<SYNOPSIS>Street or postal address.</SYNOPSIS></EXPLAIN>
<MODEL><STRING></STRING></MODEL>
</ELEMENTTYPE>
<H3>City</H3>
<ELEMENTTYPE NAME="city">
<EXPLAIN><TITLE>City Name or Code</TITLE>
<P>The city name or code is a string that contains sufficient information to identify a city within a designated state.</P>
</EXPLAIN>
<MODEL><STRING></STRING></MODEL>
</ELEMENTTYPE>
<H3>State</H3>
<ELEMENTTYPE NAME="state">
<EXPLAIN><TITLE>State, Province or Prefecture Name or Code</TITLE>
<P>The state name or code contains sufficient information to identify a state within a designated country.</P></EXPLAIN>
<MODEL><STRING DATATYPE="COUNTRY.US.SUBENTITY"></STRING></MODEL>
</ELEMENTTYPE>
<H3>Postal Code</H3>
<ELEMENTTYPE NAME="postcode">
<EXPLAIN><TITLE>Postal Code</TITLE>
<P>A postal code is an alphanumeric code, designated by an appropriate postal authority, that is used to identify a location or region within the jurisdiction of that postal authority. Postal authorities include designated national postal authorities.</P></EXPLAIN>
<MODEL><STRING DATATYPE="string"></STRING></MODEL>
</ELEMENTTYPE>
<H3>Country</H3>
<ELEMENTTYPE NAME="country">
<EXPLAIN><TITLE>Country Code</TITLE>
<P>A country code is a two-letter code, designated by ISO, that is used to uniquely identify a country.</P></EXPLAIN>
<MODEL><STRING DATATYPE="country"></STRING></MODEL>
</ELEMENTTYPE>
<H3>Network Addresses</H3>
<ELEMENTTYPE NAME="telephone">
<EXPLAIN><TITLE>Telephone Number</TITLE>
<P>A telephone number is a string of alphanumerics and punctuation that uniquely identifies a telephone service terminal, including extension number.</P></EXPLAIN>
<MODEL><STRING></STRING></MODEL>
</ELEMENTTYPE>
<H3>Fax</H3>
<ELEMENTTYPE NAME="fax">
<EXPLAIN><TITLE>Fax Number</TITLE>
<P>A fax number is a string of alphanumerics and punctuation that uniquely identifies a fax service terminal.</P>
</EXPLAIN>
<MODEL><STRING></STRING></MODEL>
</ELEMENTTYPE>
<H3>Email</H3>
<ELEMENTTYPE NAME="email">
<EXPLAIN><TITLE>Email Address</TITLE>
<P>An email address is a datatype-constrained string that uniquely identifies a mailbox on a server.</P></EXPLAIN>
<MODEL><STRING DATATYPE="email"></STRING></MODEL>
</ELEMENTTYPE>
<H3>Internet Address</H3>
<ELEMENTTYPE NAME="internet">
<EXPLAIN><TITLE>Internet Address</TITLE>
<P>An Internet address is a datatype-constrained string that uniquely identifies a resource on the Internet by means of a URL.</P></EXPLAIN>
<MODEL><STRING DATATYPE="url"></STRING></MODEL>
</ELEMENTTYPE>
</DTD>
</SCHEMA>
```

Service Description Sample

```
<!DOCTYPE SCHEMA SYSTEM "bidl.dtd">
<SCHEMA>
<H1>Service Description Sample BID</H1>
<META
WHO.OWNS="Veo Systems"    WHO.COPYRIGHT="VeoSystems"
```

-continued

| | |
|---|---|
| WHEN.COPYRIGHT="1998" | DESCRIPTION="Sample BID" |
| WHO.CREATED="*" | WHEN.CREATED="*" |
| WHAT.VERSION="*" | WHO.MODIFIED="*" |
| WHEN.MODIFIED="*" | WHEN.EFFECTIVE="*" |
| WHEN.EXPIRES="*" | WHO.EFFECTIVE="*" |
| WHO.EXPIRES="*"> | |
| </META> | |

```
<PROLOG>
<XMLDECL STANDALONE="no"></XMLDECL>
<DOCTYPE NAME="service">
<SYSTEM>service.dtd</SYSTEM></DOCTYPE>
</PROLOG>
<DTD NAME="service.dtd">
<H2>Services</H2>
<H3>Includes</H3>
<!--INCLUDE><SYSTEM>comments.bim</
   SYSTEM></INCLUDE-->
<H3>Service Set</H3>
<ELEMENTTYPE NAME="service.set">
<EXPLAIN><TITLE>Service Set</TITLE>
<SYNOPSIS>A set of services.</SYNOPSIS></
   EXPLAIN>
<MODEL>
<ELEMENT NAME="service" OCCURS="+"></
   ELEMENT>
</MODEL></ELEMENTTYPE>
<H3>Services Prototype</H3>
<PROTOTYPE NAME="prototype.service">
<EXPLAIN><TITLE>Service</TITLE></EXPLAIN>
<MODEL><SEQUENCE>
<ELEMENT NAME="service.name"></ELEMENT>
<ELEMENT NAME="service.terms" OCCURS="+"></
   ELEMENT>
<ELEMENT NAME="service.location" OCCURS="+
   "></ELEMENT>
<ELEMENT NAME="service.operation" OCCURS="+
   "></ELEMENT>
</SEQUENCE></MODEL>
<!--ATTGROUP><IMPLEMENTS HREF=
   "common.attrib"></IMPLEMENTS></
   ATTGROUP-->
</PROTOTYPE>
<H3>Service</H3>
<INTRO><P>A service is an addressable network
   resource that provides interfaces to specific operations
   by way of input and output documents.</P></INTRO>
<ELEMENTTYPE NAME="service">
<EXPLAIN><TITLE>Service</TITLE>
<P>A service is defined in terms of its name, the location
   (s) at which the service is available, and the operation
   (s) that the service performs.</P></EXPLAIN>
<MODEL><SEQUENCE>
<ELEMENT NAME="service.name"></ELEMENT>
<ELEMENT NAME="service.location"></ELEMENT>
<ELEMENT NAME="service.operation" OCCURS="+
   "></ELEMENT>
<ELEMENT NAME="service.terms"></ELEMENT>
</SEQUENCE></MODEL>
</ELEMENTTYPE>
<H3>Service Name</H3>
<ELEMENTTYPE NAME="service.name">
<EXPLAIN><TITLE>Service Name</TITLE>
<P>The service name is a human-readable string that
   ascribes a moniker for a service. It may be employed is
   user interfaces and documentation, or for other
   purposes.</P></EXPLAIN>
<MODEL><STRING></STRING></MODEL>
</ELEMENTTYPE>
<H3>Service Location</H3>
<ELEMENTTYPE NAME="service.location">
<EXPLAIN><TITLE>Service Location</TITLE>
<SYNOPSIS>A URI of a service.</SYNOPSIS>
<P>A service location is a datatype-constrained string that
   locates a service on the Internet by means of a URI.</
   P></EXPLAIN>
<MODEL><STRING DATATYPE="url"></STRING></
   MODEL>
</ELEMENTTYPE>
<H3>Service Operations</H3>
<INTRO><P>A service operation consists of a name,
   location and its interface, as identified by the type of
   input document that the service operation accepts and
   by the type of document that it will return as a result.</
   P></INTRO>
<ELEMENTTYPE NAME="service.operation">
<EXPLAIN><TITLE>Service Operations</TITLE>
<P>A service operation must have a name, a location, and
   at least one document type as an input, with one or
   more possible document types returned as a result of
   the operation.</P>
</EXPLAIN>
<MODEL><SEQUENCE>
<ELEMENT NAME="service.operation.name"></
   ELEMENT>
<ELEMENT NAME="service.operation.location"></
   ELEMENT>
<ELEMENT NAME="service.operation.input"></
   ELEMENT>
<ELEMENT NAME="service.operation.output"></
   ELEMENT>
</SEQUENCE></MODEL>
</ELEMENTTYPE>
<H3>Service Operation Name</H3>
<ELEMENTTYPE NAME="service.operation.name">
<EXPLAIN><TITLE>Service Operation Name</
   TITLE>
<P>The service operation name is a human-readable
   string that ascribes a moniker to a service operation. It
   may be employed in user interfaces and documentation,
   or for other purposes.</P></EXPLAIN>
<MODEL><STRING></STRING></MODEL>
</ELEMENTTYPE>
<H3>Service Operation Location</H3>
<INTRO><P>The service location is a network resource.
   That is to say, a URI.</P></INTRO>
<ELEMENTTYPE              NAME=
   "service.operation.location">
```

```
<EXPLAIN><TITLE>Service Operation Location</
   TITLE>
<SYNOPSIS>A URI of a service operation.</
   SYNOPSIS>
<P>A service operation location is a datatype-constrained
   string that locates a service operation on the Internet by
   means of a URL.</P></EXPLAIN>
<MODEL><STRING DATATYPE="url"></STRING></
   MODEL>
</ELEMENTTYPE>
<H3>Service Operation Input Document</H3>
<INTRO><P>The input to a service operation is defined
   by its input document type. That is, the service opera-
   tion is invoked when the service operation location
   receives an input document whose type corresponds to
   the document type specified by this element.</P>
<P>Rather than define the expected input and output
   document types in the market participant document,
   this example provides pointers to externally-defined
   BIDs. This allows reuse of the same BID as the input
   and/or output document type for multiple operations. In
   addition, it encourages parallel design and
   implementation.</P></INTRO>
<ELEMENTTYPE NAME="service.operation.input">
<EXPLAIN><TITLE>Service Operation Input</TITLE>
<SYNOPSIS>Identifies the type of the service operation
   input document.</SYNOPSIS>
<P>Service location input is a datatype-constrained string
   that identifies a BID on the Internet by means of a
   URI.</P>
</EXPLAIN>
<MODEL><STRING DATATYPE="url"></STRING></
   MODEL>
</ELEMENTTYPE>
<H3>Service Operation Output Document Type</H3>
<INTRO><P>The output of a service operation is defined
   by its output document type(s). That is, the service
   operation is expected to emit a document whose type
   corresponds to the document type specified by this
   element.</P></INTRO>
<ELEMENTTYPE NAME="service.operation.output">
<EXPLAIN><TITLE>Service Operation Output</
   TITLE>
<SYNOPSIS>Identifies the type of the service operation
   output document.</SYNOPSIS>
<P>Service location output is a datatype-constrained
   string that identifies a BID on the Internet by means of
   a URI.</P>
</EXPLAIN>
<MODEL><STRING DATATYPE="url"></STRING></
   MODEL>
</ELEMENTTYPE>
<H3>Service Terms</H3>
<INTRO><P>This is a simple collection of string
   elements, describing the terms of an agreement.</P></
   INTRO>
<ELEMENTTYPE NAME="service.terms">
<EXPLAIN><TITLE>Service Terms</TITLE>
<SYNOPSIS>Describes the terms of a given
   agreement.</SYNOPSIS>
</EXPLAIN>
<MODEL><STRING DATATYPE="string"></
   STRING></MODEL>
</ELEMENTTYPE>
</DTD>
</SCHEMA>
```

The service DTD schema may be extended with a service type element in a common business language repository as follows:

```
<!ELEMENT service.type EMPTY>
<!ATTLIST service.type
   service.type.name (
   catalog.operator
   | commercial.directory.operator
   | eft.services.provider
   | escrower
   | fulfillment.service
   | insurer
   | manufacturer
   | market.operator
   | order.originator
   | ordering.service
   | personal.services.provider
   | retailer
   | retail.aggregator
   | schema.resolution.service
   | service.provider
   | shipment.acceptor
   | shipper
   | van
   | wholesale.aggregator
   ) #REQUIRED
   %common.attrib;
```

The service type element above illustrates interpretation information carried by a business interface definition, in this example a content form allowing identification of any one of a list of valid service types. Other interpretation information includes data typing, such as for example the element <H3>Internet Address</H3> including the content form "url" and expressed in the data type "string." Yet other interpretation information includes mapping of codes to elements of a list, such as for example the element <H3>State</H3> including the code mapping for states in the file "COUNTRY.US.SUBENTITY."

The service description referred to by the market participant DTD defines the documents that the service accepts and generates upon competition of the service. A basic service description is specified below as a XML document transact.dtd.

Transact.dtd models a transaction description, such as an invoice, or a description of an exchange of value. This document type supports many uses, so the transaction description element has an attribute that allows user to distinguish among invoices, performance, offers to sell, requests for quotes and so on. The exchange may occur among more than two parties, but only two are called out, the offeror and the counter party, each of whom is represented by a pointer to a document conforming to the market participant DTD outlined above. The counter party pointer is optional, to accommodate offers to sell. The exchange description is described in the module tranprim.mod listed below, and includes pricing and subtotals. Following the exchange description, charges applying to the transaction as a whole may be provided, and a total charge must be supplied. Thus, the transaction description schema document transact.dtd for this example is set forth below:

```
<!--transact.dtd Version: 1.0 -->
<!--Copyright 1998 Veo Systems, Inc. -->
. . .
<!ELEMENT transaction.description (meta?,
   issuer.pointer,
```

```
counterparty.pointer?, exhange.descrption+,
    general.charges?, net.total?)>
<!ATTLIST transaction.description
  transaction.type (invoice | pro.forma | offer.to.sell |
    order
    | request.for.quote | request.for.bid
    | request.for.proposal | response.to.request.for.quote
    | response.to.request.for.bid
    | response.to.request.for.proposal) "invoice"
  %common.attrib;
  %altrep.attrib;
  %ttl. attrib;
>
```

Representative market participant, and service DTDs, created according to the definitions above, are as follows:

Market Participant DTD

```
<!ELEMENT business (party.name+, address.set)>
<!ATTLIST business business.number CDATA
    #REQUIRED
<!ELEMENT party.name (#PCDATA)>
<!ELEMENT city (#PCDATA)>
<!ELEMENT internet (#PCDATA)>
<!ELEMENT country (#PCDATA)>
<!ELEMENT state (#PCDATA)>
<!ELEMENT email (#PCDATA)>
<!ELEMENT address.physical (street, city, state,
    postcode?, country) >
<!ELEMENT telephone (#PCDATA)>
<!ELEMENT person (party.name+, address.set) >
<!ATTLIST person SSN CDATA #IMPLIED>
<!ELEMENT fax (#PCDATA)>
<!ELEMENT street (#PCDATA)>
<!ELEMENT address.set (address.physical, telephone*,
    fax*, email*, internet*) >
<!ELEMENT postcode (#PCDATA)>
<!ELEMENT market.participant (business | person) >
```

Service DTD

```
<!ELEMENT service.location (#PCDATA)>
<!ELEMENT service.terms (#PCDATA)>
<!ELEMENT service.operation.name (#PCDATA)>
<!ELEMENT service.operation (service.operation.name,
    service.operation.location, service.operation.input,
    service.operation.output) >
<!ELEMENT service (service.name, service.location,
    service.operation+, service.terms) >
<!ELEMENT service.operation.input (#PCDATA)>
<!ELEMENT service.operation.location (#PCDATA)>
<!ELEMENT service.name (#PCDATA)>
<!ELEMENT service.set (service+)>
<!ELEMENT service.operation.output (#PCDATA)>
```

One instance of a document produced according to the transact.dtd follows:

```
<?xml version="1.0"?>
<!-- rorder.xml Version: 1.0 -->
<!-- Copyright 1998 Veo Systems, Inc. -->
<!DOCTYPE transaction.description SYSTEM "urn:x-
    veosystems:dtd:cbl:transact: 1.0:>
<transaction.description transaction.type="order">
<meta>
<urn?urn:x-veosystems:doc:00023
</urn>
<thread.id party.assigned.by="reqorg">FRT876
</thread.id>
</meta>
<issuer.pointer>
    <xll.locator urllink="reqorg.xml">Customer
    Pointer
    </xll.locator>
</issuer.pointer>
<counterparty.pointer>
    <xll.locator urllink="compu.xml">Catalog entry
        owner
    pointer
    </xll.locator>
</counterparty.pointer>
<exchange.description>
<line.item>
    <product.instance>
    <product.description.pointer>
        <xll.locator urllink="cthink.xml">Catalogue Entry
            Pointer
        </xll.locator>
    </product.description.pointer>
    <product.specifics>
    <info.description.set>
<info.description>
<xml.descriptor>
    <doctype>
    <dtd system.id="urn:x-veosystems:dtd:cbl:gprod: 1.0
        "/>
    </doctype>
    <xml.descriptor.details>
    <xll.xptr.frag>DESCENDANT(ALL,os)STRING
        ("Windows 95")
    </xll.xptr.frag>
    <xll.xptr.frag>DECENDANT(ALL,p.speed)
        STRING("200")
    </xll.xptr.frag>
    <xll.xptr.frag>DESCENDANT(ALL,
        hard.disk.capacity) STRING("4")
    </xll.xptr.frag>
    <xll.xptr.frag>DESCENDANT(ALL,d.size)
        STRING("14.1")
    </xll.xptr.frag>
    </xml.descriptor.details>
</xml.descriptor>
</info.description>
    </info.description.set>
    </product.specifics>
<quantity>1
</quantity>
    </product.instance>
<shipment.coordinates.set>
<shipment.coordinates>
<shipment.destination>
    <address.set>
    <address.named>SW-1
    </address.named>
    <address.physical>
        <building.sublocation>208C</
            building.sublocation>
        <location.in.street>123
        </location.in.street>
        <street>Frontage Rd.
        </street>
        <city>Beltway
```

```
        </city>
        <country.subentity.us
        country.subentity.us.name="MD"/>
        <postcode>20000
        </postcode>
    </address.physical>
    <telephone>
        <telephone.number>617-666-2000
        </telephone.number>
        <telephone.extension>1201
        </telephone.extension>
    </telephone>
    </address.set>
</shipment.destination>
<shipment.special>No deliveries after 4 PM</
    shipment.special>
</shipment.coordinates>
</shipment.coordinates.set>
    <payment.set>
        <credit.card
        issuer.name="VISA"
        instrument.number="3787-812345-67893"
        expiry.date="12/97"
        currency.code="USD"/>
        <amount.group>
            <amount.monetary currency.code="USD">3975
            </amount.monetary>
        </amount.group>
    </payment.set>
</line.item>
</exchange.description>
</transaction.description>
```

Accordingly, the present invention provides a technique by which a market participant is able to identify itself, and identify the types of input documents and the types of output documents with which it is willing to transact business. The particular manner in which the content carried in such documents is processed by the other parties to the transaction, or by the local party, is not involved in establishing a business relationship nor carrying out transactions.

Figure 3:
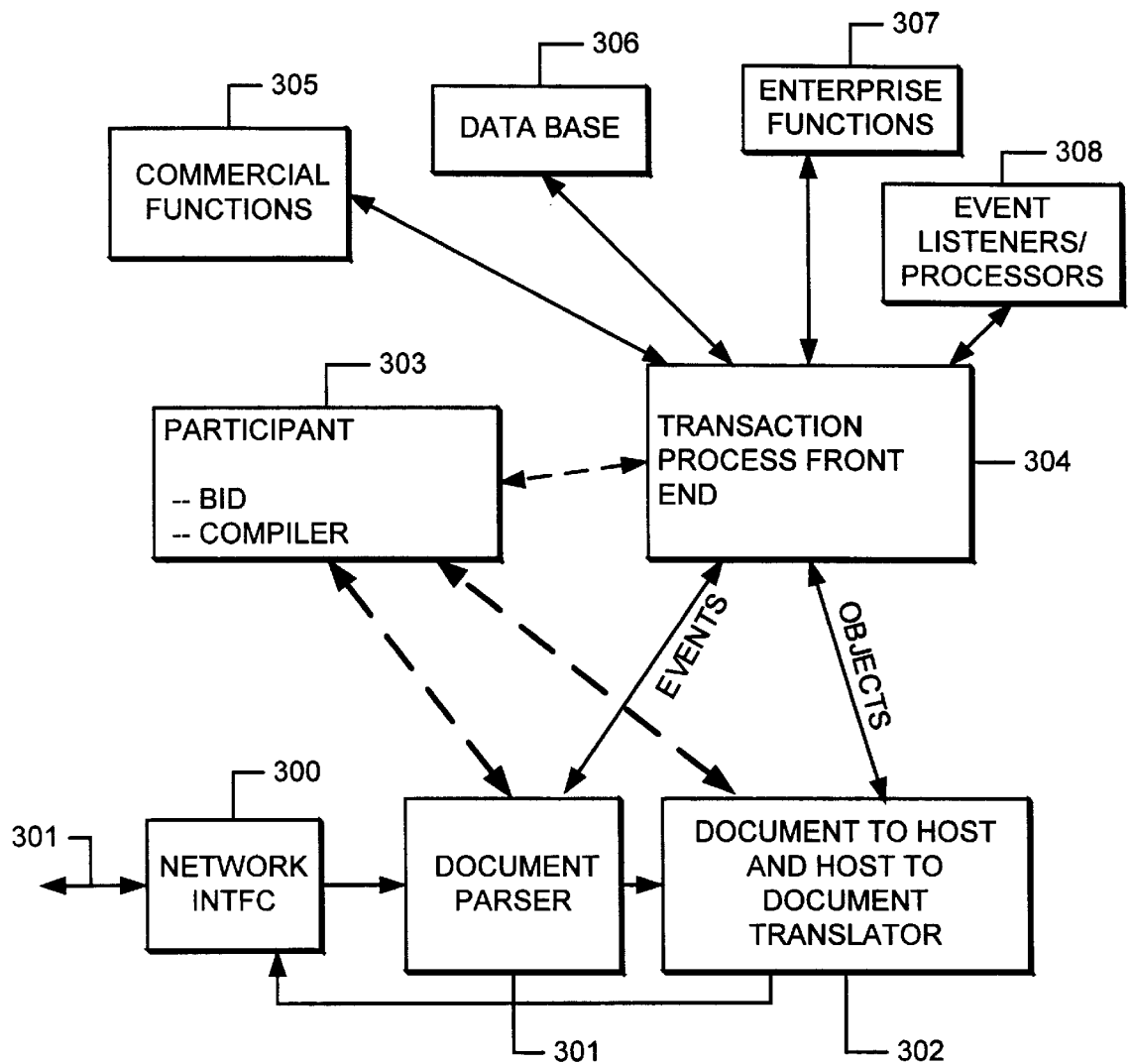
FIG. 3 is a conceptual block diagram of a server for a participant node in the network of the present invention.

FIG. 3 provides a simplified view of a participant node in the network according to the present invention. The node illustrated in FIG. 3 includes a network interface 300 which is coupled to a communication network on port 301. The network interface is coupled to a document parser 301. The parser 301 supplies the logical structures from an incoming document to a translator module 302, which provides for translating the incoming document into a form usable by the host transaction system, and vice versa translating the output of host processes into the format of a document which matches the output document form in the business interface definition for transmission to a destination. The parser 301 and translator 302 are responsive to the business interface definition stored in the participant module 303.

The output data structures from the translator 302 are supplied to a transaction process front end 304 along with events signaled by the parser 301. The front end 304 in one embodiment consists of a JAVA virtual machine or other similar interface adapted for communication amongst diverse nodes in a network. The transaction processing front end 304 responds to the events indicated by the parser 301 and the translator 302 to route the incoming data to appropriate functions in the enterprise systems and networks to which the participant is coupled. Thus, the transaction process front end 304 in the example of FIG. 3 is coupled to commercial functions 305, database functions 306, other enterprise functions such as accounting and billing 307, and to the specific event listeners and processors 308 which are designed to respond to the events indicated by the parser.

The parser 301 takes a purchase order like that in the example above, or other document, specified according to the business interface definition and creates a set of events that are recognized by the local transaction processing architecture, such as a set of JAVA events for a JAVA virtual machine.

The parser of the present invention is uncoupled from the programs that listen for events based on the received documents. Various pieces of mark-up in a received document or a complete document meeting certain specifications serve as instructions for listening functions to start processing. Thus listening programs carry out the business logic associated with the document information. For example, a program associated with an address element may be code that validates the postal code by checking the database. These listeners subscribe to events by registering with a document router, which directs the relevant events to all subscribers who are interested in them.

For example, the purchase order specified above may be monitored by programs listening for events generated by the parser, which would connect the document or its contents to an order entry program. Receipt of product descriptions within the purchase order, might invoke a program to check inventory. Receipt of address information within the purchase order, would then invoke a program to check availability of services for delivery. Buyer information fields in the document, could invoke processes to check order history for credit worthiness or to offer a promotion or similar processing based on knowing the identity of the consumer.

Complex listeners can be created as configurations of primitive ones. For example, a purchase order listener may contain and invoke the list listeners set out in the previous paragraph, or the list members may be invoked on their own. Note that the applications that the listeners run are unlikely to be native XML processes or native JAVA processes. In these cases, the objects would be transformed into the format required by the receiving trans application. When the application finishes processing, its output is then transformed back to the XML format for communication to other nodes in the network.

It can be seen that the market participant document type description, and the transaction document type description outlined above include a schematic mapping for logic elements in the documents, and include mark-up language based on natural language. The natural language mark-up, and other natural language attributes of XML facilitate the use of XML type mark-up languages for the specification of business interface definitions, service descriptions, and the descriptions of input and output documents.

The participant module 303 in addition to storing the business interface definition includes a compiler which is used to compile objects or other data structures to be used by the transaction process front end 304 which corresponds to the logical structures in the incoming documents, and to compile the translator 302. Thus, as the business interface definition is modified or updated by the participant as the transactions with which the participant is involved change, the translator 302 and parser 301 are automatically kept up to date.

In a preferred system, the set of JAVA events is created by a compiler which corresponds to the grove model of SGML, mainly the standard Element Structure Information Set augmented by the "property set" for each element. *International Standard ISO/IEC* 10179:1996 (*E*), *Information Technology— Processing Languages—Document Style*

*Semantics and Specification Language (DSSSL)*. Turning the XML document into a set of events for the world to process contrasts with the normal model of parsing in which the parser output is maintained as an internal data structure. By translating the elements of the XML document into JAVA events or other programming structures that are suitable for use by the transaction processing front end of the respective nodes enables rich functionality at nodes utilizing the documents being traded.

Thus, the transaction process front end 304 is able to operate in a publish and subscribe architecture that enables the addition of new listener programs without the knowledge of or impact on other listening programs in the system. Each listener, 305, 306, 307, 308 in FIG. 3, maintains a queue in which the front end 304 directs events. This enables multiple listeners to handle events in parallel at their own pace.

Furthermore, according to the present invention the applications that the listeners run need not be native XML functions, or native functions which match the format of the incoming document. Rather, these listeners may be JAVA functions, if the transaction process front end 304 is a JAVA interface, or may be functions which run according to a unique transaction processing architecture. In these cases, the objects would be transformed into the format required by the receiving application. When the application of the listener finishes, its output is then transformed back into the format of a document as specified by the business interface definition in the module 303. Thus, the translator 302 is coupled to the network interface 300 directly for supplying the composed documents as outputs.

The listeners coupled to the transaction processing front end may include listeners for input documents, listeners for specific elements of the input documents, and listeners for attributes stored in particular elements of the input document. This enables diverse and flexible implementations of transaction processes at the participant nodes for filtering and responding to incoming documents.

Figure 4:
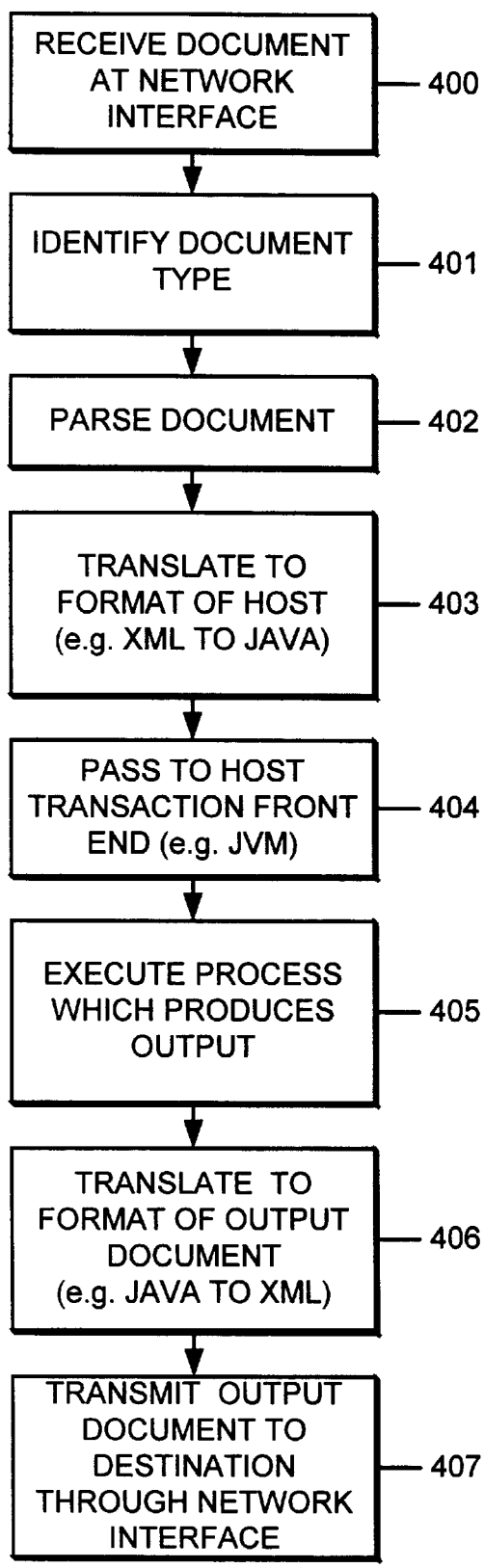
FIG. 4 is a flow chart illustrating the processing of a received document at a participant node according to the present invention.

FIG. 4 illustrates a process of receiving and processing an incoming document for the system of FIG. 3. Thus, the process begins by receiving a document at the network interface (step 400). The parser identifies the document type (401) in response to the business interface definition. Using the business interface definition, which stores a DTD for the document in the XML format, the document is parsed (step 402). Next, the elements and attributes of the document are translated into the format of the host (step 403). In this example, the XML logic structures are translated into JAVA objects which carry the data of the XML element as well as methods associated with the data such as get and set functions. Next, the host objects are transferred to the host transaction processing front end (step 404). These objects are routed to processes in response to the events indicated by the parser and the translator. The processes which receive the elements of the document are executed and produce an output (step 405). The output is translated to the format of an output document as defined by the business interface definition (step 406). In this example, the translation proceeds from the form of a JAVA object to that of an XML document. Finally, the output document is transmitted to its destination through the network interface (step 407).

Figure 5:
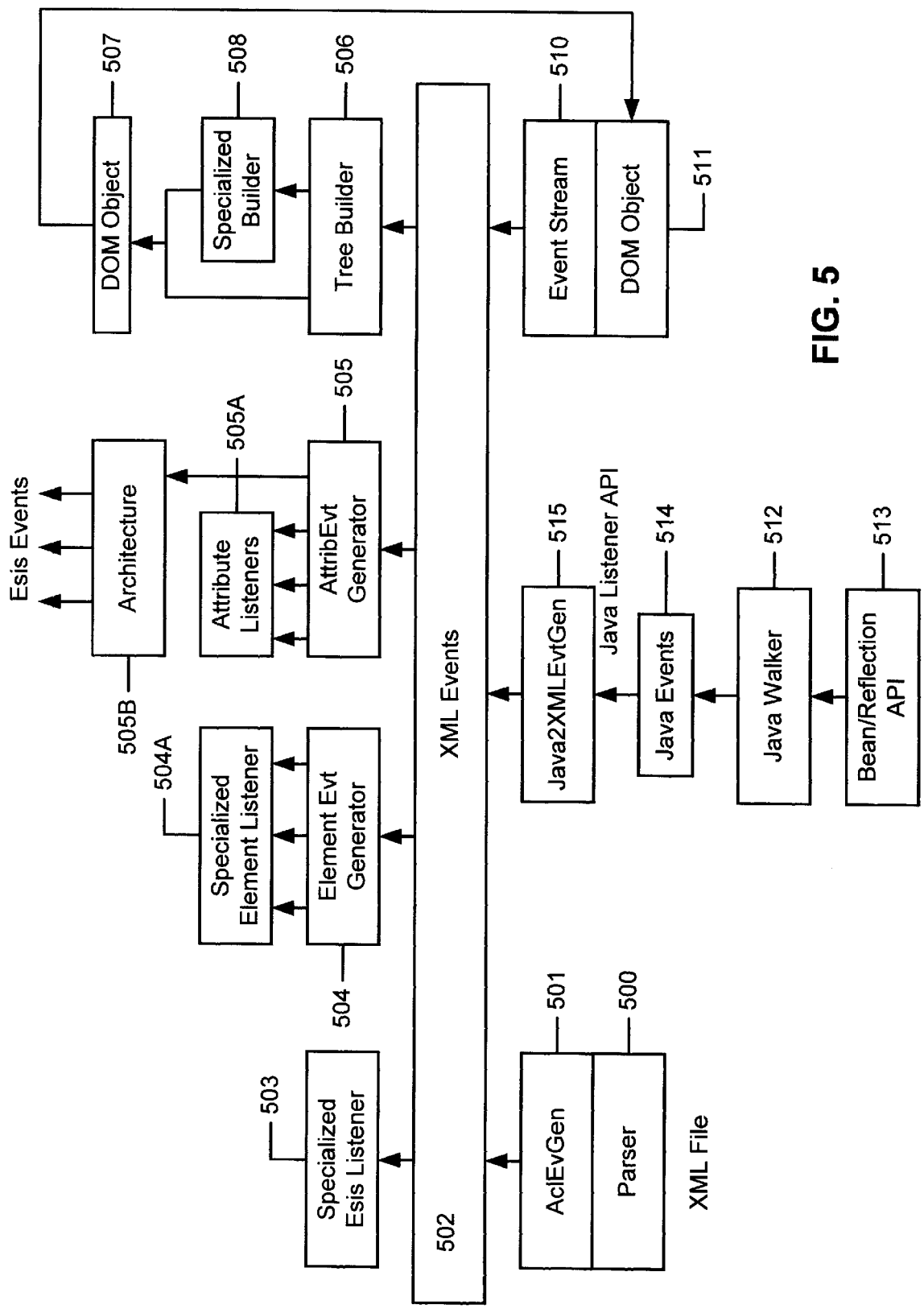
FIG. 5 is a block diagram of a parser and transaction process front end for an XML based system.

FIG. 5 is a more detailed diagram of the event generator/event listener mechanism for the system of FIG. 3. In general the approach illustrated in FIG. 5 is a refinement of the JAVA JDK 1.1 event model. In this model, three kinds of objects are considered. A first kind of object is an event object which contains information about the occurrence of an event. There may be any number of kinds of event objects, corresponding to all the different kinds of events which can occur. A second kind of object is an Event generator, which monitors activity and generates event objects when something happens. Third, event listeners, listen for event objects generated by event generators. Event listeners generally listen to specific event generators, such as for mouse clicks on a particular window. Event listeners call an "ADD event listener" method on the event generator. This model can be adapted to the environment of FIG. 3 in which the objects are generated in response to parsing and walking a graph of objects, such as represented by an XML document.

The system illustrated in FIG. 5 includes a generic XML parser 500. Such parser can be implemented using a standard call back model. When a parsing event occurs, the parser calls a particular method in an application object, passing in the appropriate information in the parameters. Thus a single application 501 resides with the parser. The application packages the information provided by the parser in an XML event object and sends it to as many event listeners as have identified themselves, as indicated by the block 502. The set of events 502 is completely parser independent. The events 502 can be supplied to any number of listeners and any number of threads on any number of machines. The events are based on the element structure information set ESIS in one alternative. Thus, they consist of a list of the important aspects of a document structure, such as the starts and ends of elements, or of the recognition of an attribute. XML (and SGML) parsers generally use the ESIS structure as a default set of information for a parser to return to its application.

A specialized ESIS listener 503 is coupled to the set of events 502. This listener 503 implements the ESIS listener API, and listens for all XML events from one or more generators. An element event generator 504 is a specialized ESIS listener which is also an XML event generator. Its listeners are objects only interested in events for particular types of elements. For example in an HTML environment, the listener may only be interested in ordered lists, that is only the part of the document between the <OL> and </OL>tags. For another example, a listener may listen for "party.name" elements, or for "service.name" elements according to the common business language, from the example documents above, process the events to ensure that the elements carry data that matches the schematic mapping for the element, and react according to the process needed at the receiving node.

This allows the system to have small objects that listen for particular parts of the document, such as one which only adds up prices. Since listeners can both add and remove themselves from a generator, there can be a listener which only listens to for example the <HEAD> part of an HTML document. Because of this and because of the highly recursive nature of XML documents, it is possible to write highly targeted code, and to write concurrent listeners. For example, an <OL> listener can set up an <LI> listener completely separate from the manner in which the <UL> (unordered list) listener sets up its <LI> listener. Alternatively, it can create a listener which generates a graphic user interface and another which searches a database using the same input. Thus, the document is treated as a program executed by the listeners, as opposed to the finished data structure which the application examines one piece at a time. If an application is written this way, it is not necessary to have the entire document in memory to execute an application.

The next listener coupled to the set of events 502 is an attribute filter 505. The attribute filter 505 like the element filter 504 is an attribute event generator according to the ESIS listener model. The listener for an attribute filter specifies the attributes it is interested in, and receives events for any element having that attribute specified. So for example, a font manager might receive events only for elements having a font attribute, such as the <P FONT= "Times Roman"/P>.

The element event generator 504 supplies such element objects to specialize the element listeners 504A.

The attribute event generator 505 supplies the attribute event objects to attribute listeners 505A. Similarly, the attribute objects are supplied to a "architecture" in the sense of an SGML/XML transformation from one document type to another using attributes. Thus the architecture of 505B allows a particular attribute with a particular name to be distinguished. Only elements with that attribute defined become part of the output document, and the name of the element in the output document is the value of the attribute in the input document. For example, if the architecture 505B is HTML, the string:

<PURCHASES HTML="OL"><ITEM HTML= "LI"><NAME

HTML="B">STUFF</NAME><PRICE

HTML="B">123</PRICE></ITEM></PURCHASES>
    translates into:

<OL><LI><B>STUFF</B><B>123</B></LI></OL>
    which is correct HTML.

The next module which is coupled to the set of events 502 is a tree builder 506. The tree builder takes a stream of XML events and generates a tree representation of the underlying document. One preferred version of the tree builder 506 generates a document object model DOM object 507, according to the specification of the W3C (See, http://www.w3.org/TR/1998/WD-DOM-19980720/introduction.html). However listeners in event streams can be used to handle most requirements, a tree version is useful for supporting queries around a document, reordering of nodes, creation of new documents, and supporting a data structure in memory from which the same event stream can be generated multiple times, for example like parsing the document many times. A specialized builder 508 can be coupled to the tree builder 506 in order to build special subtrees for parts of the document as suits a particular implementation.

In addition to responses to incoming documents, other sources of XML events 502 can be provided. Thus, an event stream 510 is generated by walking over a tree of DOM objects and regenerating the original event stream created when the document was being parsed. This allows the system to present the appearance that the document is being parsed several times.

The idea of an object which walks a tree and generates a stream of events can be generalize beyond the tree of DOM objects, to any tree of objects which can be queried. Thus, a JAVA walker 512 may be an application which walks a tree of JAVA bean components 513. The walker walks over all the publicly accessible fields and methods. The walker keeps track of the objects it has already visited to ensure that it doesn't go into an endless cycle. JAVA events 514 are the type of events generated by the JAVA walker 512. This currently includes most of the kinds of information one can derive from an object. This is the JAVA equivalent of ESIS and allows the same programming approach applied to XML to be applied to JAVA objects generally, although particularly to JAVA beans.

The JAVA to XML event generator 515 constitutes a JAVA listener and a JAVA event generator. It receives the stream of events 514 from the JAVA walker 512 and translates selected ones to present a JAVA object as an XML document. In the one preferred embodiment, the event generator 515 exploits the JAVA beans API. Each object seen becomes an element, with the element name the same as the class name. Within that element, each embedded method also becomes an element whose content is the value returned by invoking the method. If it is an object or an array of objects, then these are walked in turn.

Figure 6:
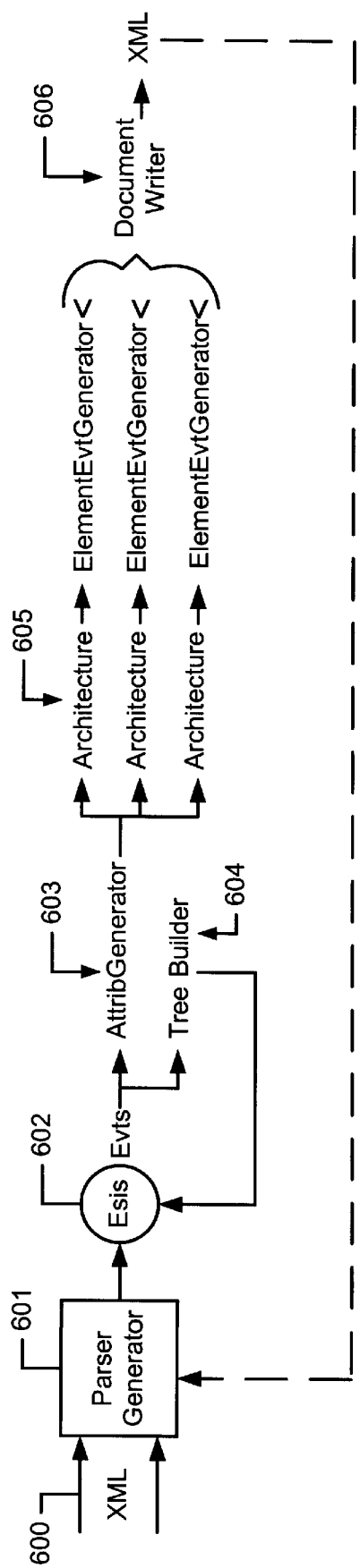
FIG. 6 is a conceptual diagram of the flow of a parse function.

FIG. 6 outlines a particular application built on the framework of FIG. 5. This application takes in an XML document 600 and applies it to a parser/generator 601. ESIS events 602 are generated and supplied to an attribute generator 603 and tree builder 604. The attribute generator corresponds to the generator 505 of FIG. 5. It supplies the events to the "architecture" 505B for translating the XML input to an HTML output for example. These events are processed in parallel as indicated by block 605 and processed by listeners. The output of the listeners are supplied to a document writer 506 and then translated back to an XML format for output. Thus for example this application illustrated in FIG. 6 takes an XML document and outputs an HTML document containing a form. The form is then sent to a browser, and the result is converted back to XML. For this exercise, the architecture concept provides the mapping from XML to HTML. The three architectures included in FIG. 6 include one for providing the structure of the HTML document, such as tables and lists, a second specifying text to be displayed, such as labels for input fields on the browser document, and the third describes the input fields themselves. The elements of the XML document required to maintain the XML documents structure become invisible fields in the HTML form. This is useful for use in reconstruction of the XML document from the information the client will put into the HTTP post message that is sent back to the server. Each architecture takes the input document and transforms it into an architecture based on a subset of HTML. Listeners listening for these events, output events for the HTML document, which then go to a document writer object. The document writer object listens to XML events and turns them back into an XML document. The document writer object is a listener to all the element generators listening to the architectures in this example.

The organization of the processing module illustrated in FIGS. 5 and 6 is representative of one embodiment of the parser and transaction process front end for the system of FIG. 3. As can be seen, a very flexible interface is provided by which diverse transaction processes can be executed in response to the incoming XML documents, or other structured document formats.

Figure 7:
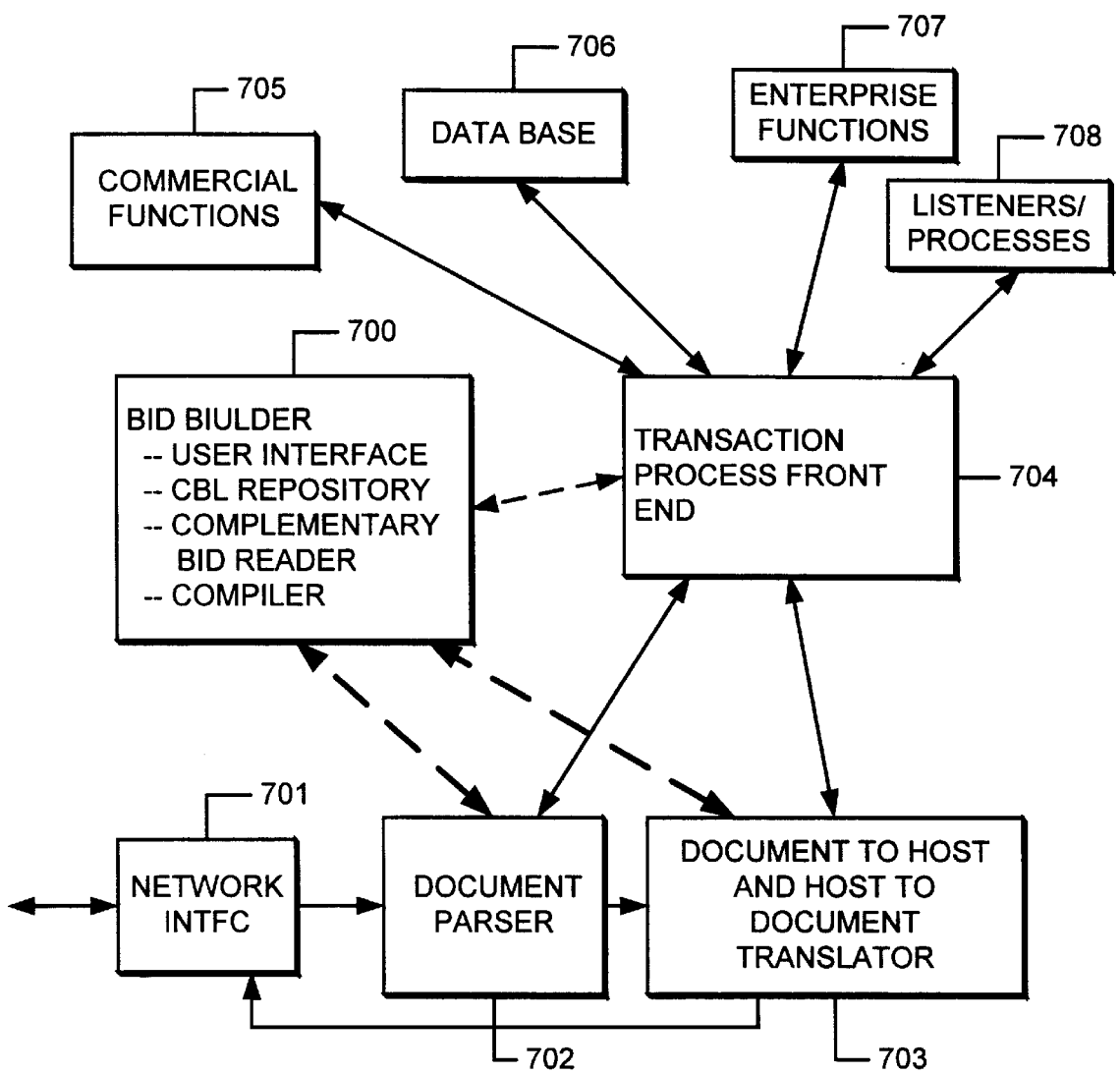
FIG. 7 is a simplified diagram of the resources at a server used for building a business interface definition according to the present invention.

FIG. 7 illustrates a node similar to that of FIG. 3, except that it includes a business interface definition builder module 700. Thus, the system of FIG. 7 includes a network interface 701, a document parser 702, and a document translator 703. The translator 703 supplies its output to a transaction processing front end 704, which in turn is coupled to listening functions such as commercial functions 705, a database 706, enterprise functions 707, and other generic listeners and processors 708. As illustrated in FIG. 7, the business interface definition builder 700 includes a user interface, a common business library CBL repository, a process for reading complementary business interface definitions, and a compiler. The user interface is used to assist an enterprise in the building of a business interface definition relying on the common business library repository, and the ability to read complementary business interface definitions. Thus, the input document of a complementary business interface definition can be specified as the output document of a particular transaction, and the output document of the complementary business interface definition can be specified as the input to such transaction process. In a similar manner a transaction business interface definition can be composed using components selected from the CBL repository. The use of the CBL repository encourages the use of standardized document formats, such as the example schema (bid1) documents above, logical structures and interpretation information in the building of business interface definitions which can be readily adopted by other people in the network.

The business interface definition builder module 700 also includes a compiler which is used for generating the translator 703, the objects to be produced by the translator according to the host transaction processing architecture, and to manage the parsing function 702.

Figure 8:
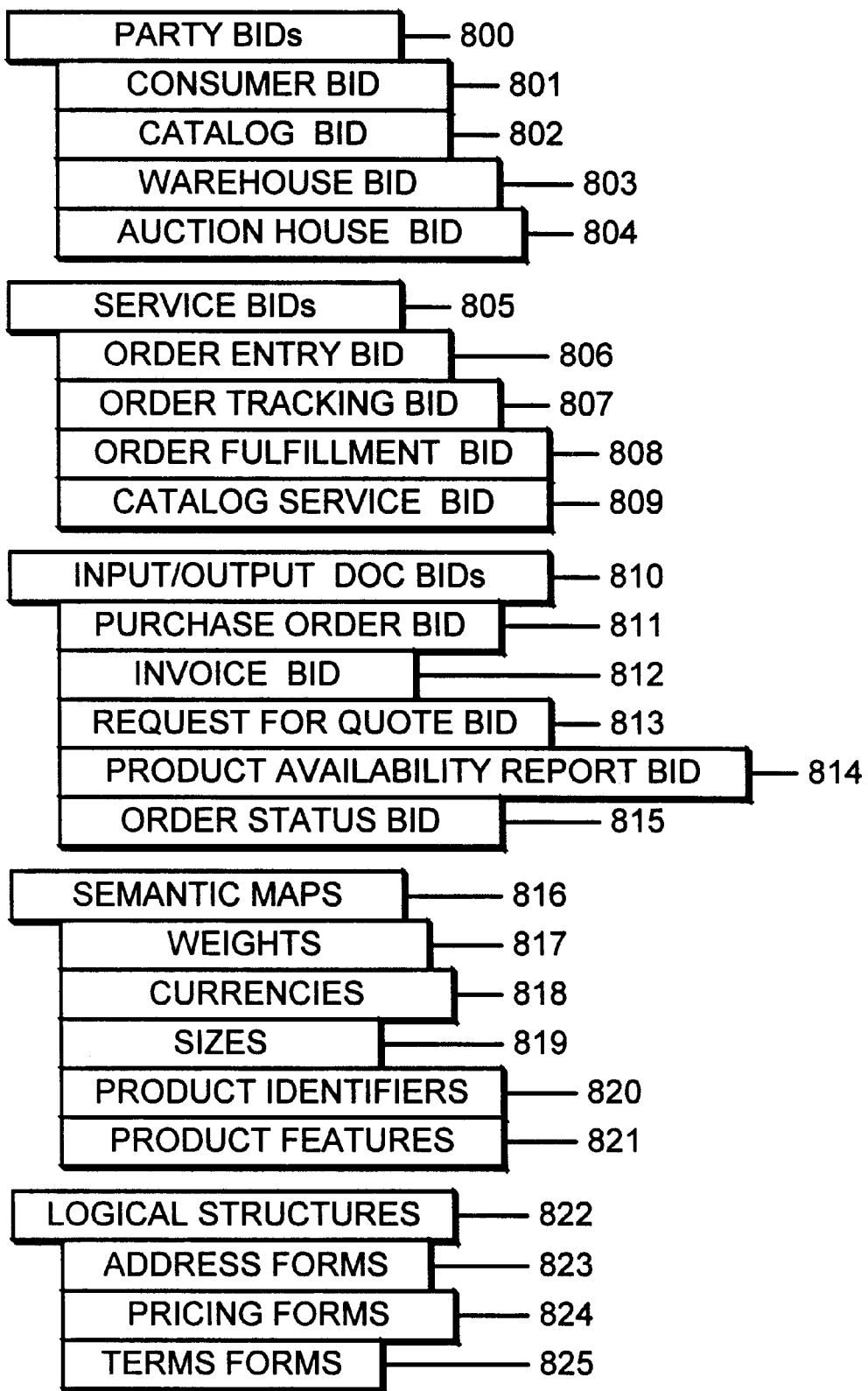
FIG. 8 is a simplified diagram of a repository according to the present invention for use for building business interface definitions.

FIG. 8 is a heuristic diagram showing logical structures stored in the repository in the business interface definition builder 700. Thus, the repository storage representative party business interface definitions 800, including for example a consumer BID 801, a catalog house BID 802, a warehouse BID 803, and an auction house BID 804. Thus, a new participant in an online market may select as a basic interface description one of the standardized BIDs which best matches its business. In addition, the repository will store a set of service business interface definitions 805. For example, an order entry BID 806, an order tracking BID 807, an order fulfillment BID 808, and a catalog service BID 809 could be stored. As a new participant in the market builds a business interface definition, it may select the business interface definitions of standardized services stored in the repository.

In addition to the party and service BIDs, input and output document BIDs are stored in the repository as indicated by the field 810. Thus, a purchase order BID 811, an invoice BID 812, a request for quote BID 813, a product availability report BID 814, and an order status BID 815 might be stored in the repository.

The repository, in addition to the business interface definitions which in a preferred system are specified as document type definitions according to XML, stores interpretation information in the form of semantic maps as indicated by the field 816. Thus, semantic maps which are used for specifying weights 817, currencies 818, sizes 819, product identifiers 820, and product features 821 in this example might be stored in the repository. Further, the interpretation information provides for typing of data structures within the logical structures of documents.

In addition, logical structures used in the composing of business interface definitions could be stored in the repository as indicated by block 822. Thus, forms for providing address information 823, forms for providing pricing information 824, and forms for providing terms of contractual relationships could be provided 825. As the network expands, the CBL repository will also expand and standardize tending to make the addition of new participants, and the modification of business interface definitions easier.

Figure 9:
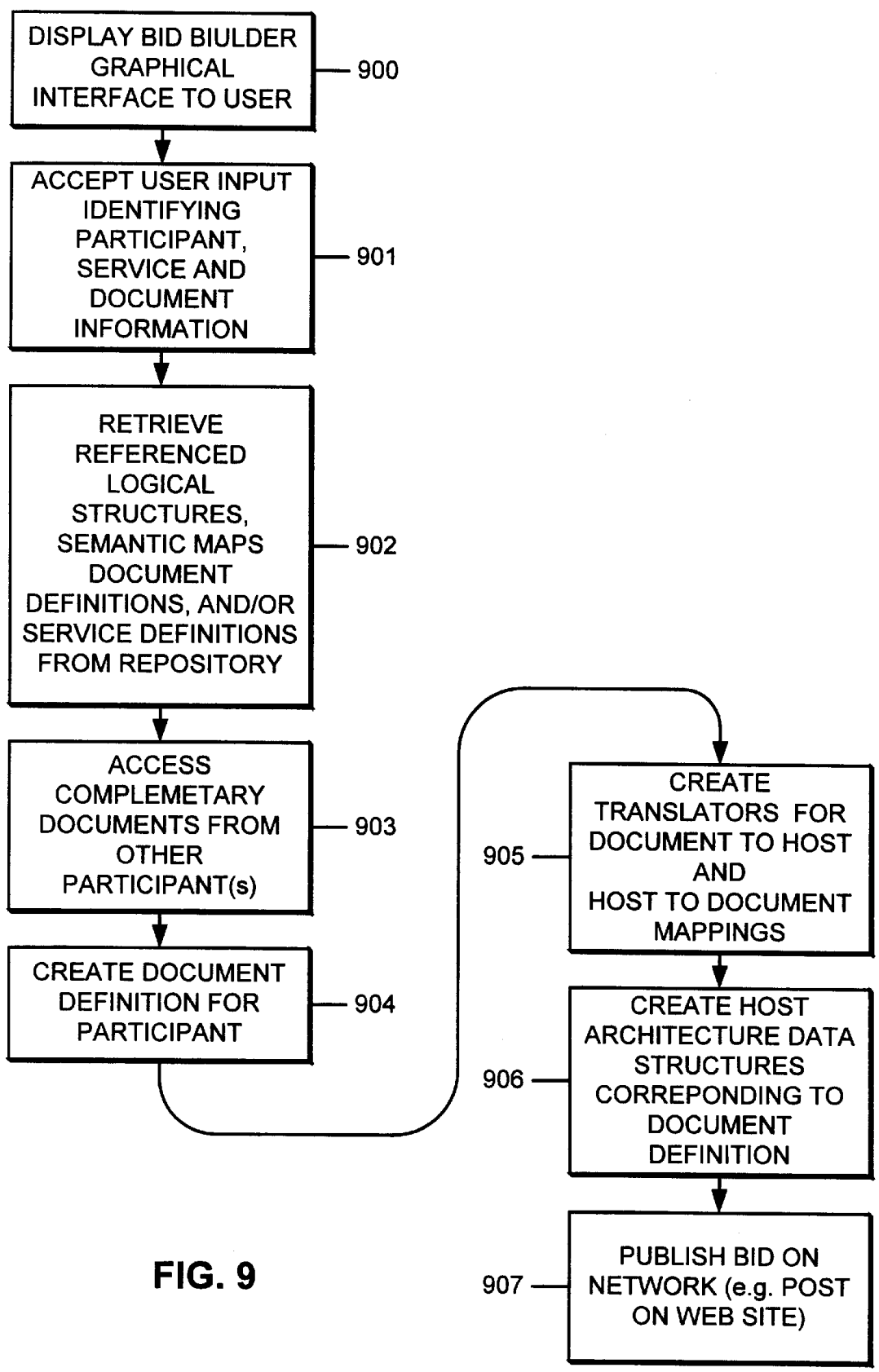
FIG. 9 is a flow chart illustrating the processes of building a business interface definition according to the present invention.

FIG. 9 illustrates the process of building a business interface definition using the system of FIG. 7. The process begins by displaying a BID builder graphical interface to the user (step 900). The system accepts user input identifying a participant, service and document information generated by the graphical interface (step 901).

Next, any referenced logical structures, interpretation information, document definitions and/or service definitions are retrieved from the repository in response to user input via the graphical user interface (step 902). In the next step, any complementary business interface definitions or components of business interface definitions are accessed from other participants in the network selected via user input, by customized search engines, web browsers or otherwise (step 903). A document definition for the participant is created using the information gathered (step 904). The translators for the document to host and host to document mappers are created by the compiler (step 905). Host architecture data structures corresponding to the definition are created by the compiler (step 906), and the business interface definition which has been created is posted on the network, such as by posting on a website or otherwise, making it accessible to other nodes in the network (step 907).

Business interface definitions tell potential trading partners the online services the company offers and which documents to use to invoke those services. Thus, the services are defined in the business interface definition by the documents that they accept and produce. This is illustrated in the following fragment of an XML service definition.

```
<service>
<service.name>Order Service</service.name>
<service.location>www.veosystems.com/order</service.location>
<service.op>
<service.op.name>Submit Order</service.op.name>
<service.op.inputdoc>www.commerce.net/po.dtd</service.op.inputdoc>
<service.op.outputdoc>
   www.veosystems.com/invoice.dtd</service.op.outputdoc>
</service.op>
<service.op>
<service.op.name>Track Order</service.op.name>
<service.op.inputdoc>www.commerce.net/request.track.dtd<service.op.inputdoc>
<service.op.outputdoc>
   www.veosystems.com/response.track.dtd<service.op.outputdoc>
</service.op>
</service>
```

This XML fragment defines a service consisting of two transactions, one for taking orders and the other for tracking them. Each definition expresses a contract or promise to carry out a service if a valid request is submitted to the specified Web address. The Order service here requires an input document that conforms to a standard "po.dtd" Document Type Definition located in the repository, which may be local, or stored in an industry wide registry on the network. If a node can fulfill the order, it will return a document conforming to a customized "invoice.dtd" whose definition is local. In effect, the company is promising to do business with anyone who can submit a Purchase Order that conforms to the XML specification it declares. No prior arrangement is necessary.

The DTD is the formal specification or grammar for documents of a given type; it describes the elements, their attributes, and the order in which they must appear. For example, purchase orders typically contain the names and addresses of the buyer and seller, a set of product descriptions, and associated terms and conditions such as price and delivery dates. In Electronic Data Interchange EDI for example, the X12 850 specification is a commonly used model for purchase orders.

The repository encourages the development of XML document models from reusable semantic components that are common to many business domains. Such documents can be understood from their common message elements, even though they may appear quite different. This is the role of the Common Business Library repository.

The Common Business Library repository consists of information models for generic business concepts including:
business description primitives like companies, services, and products;
business forms like catalogs, purchase orders, and invoices;
standard measurements, date and time, location, classification codes.

This information is represented as an extensible, public set of XML building blocks that companies can customize and assemble to develop XML applications quickly. Atomic CBL elements implement industry messaging standards and conventions such as standard ISO codes for countries, currencies, addresses, and time. Low level CBL semantics have also come from analysis of proposed metadata frameworks for Internet resources, such as Dublin Core.

The next level of elements use these building blocks to implement the basic business forms such as those used in X12 EDI transactions as well as those used in emerging Internet standards such as OTP (Open Trading Protocol) and OBI (Open Buying on the Internet).

CBL's focus is on the functions and information that are common to all business domains (business description primitives like companies, services, and products; business forms like catalogs, purchase orders, and invoices; standard measurements, date and time, location, classification codes). CBL builds on standards or industry conventions for semantics where possible (e.g., the rules that specify "day/month/year" in Europe vs "month/day/year" in the U.S. are encoded in separate CBL modules).

The CBL is a language that is used for designing applications. It is designed to bridge the gap between the "document world" of XML and the "programming world" of JAVA or other transaction processing architectures. Schema embodies a philosophy of "programming with documents" in which a detailed formal specification of a document type is the master source from which a variety of related forms can be generated. These forms include XML DTDs for CBL, JAVA objects, programs for converting XML instances to and from the corresponding JAVA objects, and supporting documentation.

The CBL creates a single source from which almost all of the pieces of a system can be automatically generated by a compiler. The CBL works by extending SGML/XML, which is normally used to formally define the structures of particular document types, to include specification of the semantics associated with each information element and attribute. The limited set of (mostly) character types in SGML/XML can be extended to declare any kind of datatype.

Here is a fragment from the CBL definition for the "datetime" module:

```
<!-- datetime.mod Version: 1.0 -->
<!-- Copyright 1998 Veo Systems, Inc. -->
...
<! ELEMENT year (#PCDATA)>
<! ATTLIST year
    schema    CDATA    #FIXED    "urn:x-
        veosystems:stds:iso:8601:3.8"
>
<! ELEMENT month (#PCDATA)>
<! ATTLIST month
    schema    CDATA    #FIXED    "urn:x-
        veosystems:stds:iso:8601:3.12"
>
...
```

In this fragment, the ELEMENT "year" is defined as character data, and an associated "schema" attribute, also character data, defines the schema for "year" to be section 3.8 of the ISO 8601 standard.

This "datetime" CBL module is in fact defined as an instance of the Schema DTD. First, the module name is defined. Then the "datetime" element "YEAR" is bound to the semantics of ISO 8601:

```
<! DOCTYPE SCHEMA SYSTEM "schema.dtd">
<SCHEMA><H1>Date and Time Module</H1>
...
<ELEMNTTYPE NAME="year" DATATYPE=
    "YEAR"><MODEL>
    <STRING
DATATYPE="YEAR"></STRING></MODEL>
<ATTDEF NAME=:schema:iso8601" DATATYPE=
    "CDATA">
    <FIXED>3.8
Gregorian calendar</FIXED></ATTDEF></
    ELEMENTTYPE>
```

The example market participant and service modules above are also stored in the CBL repository.

Figure 10:
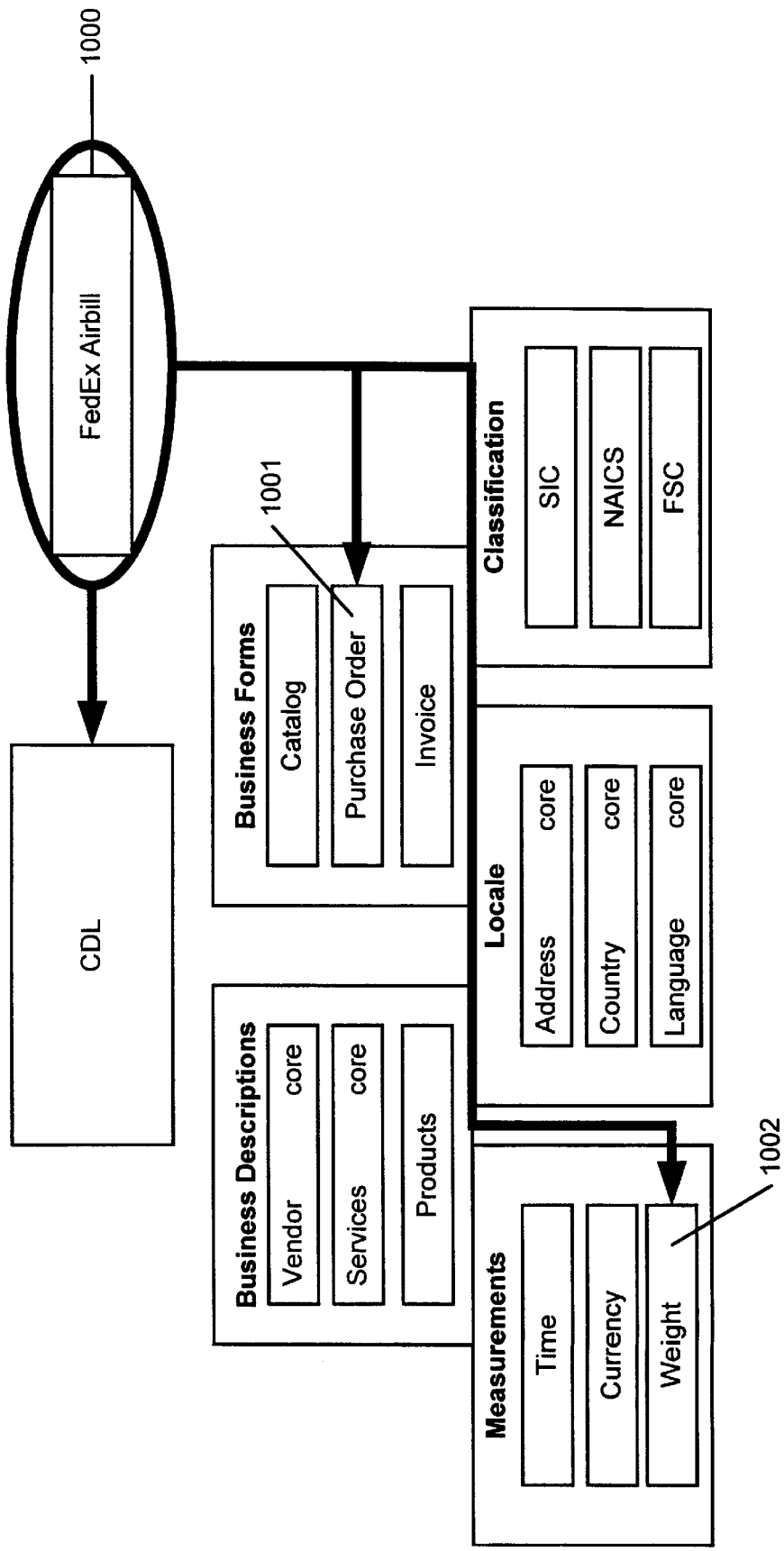
FIG. 10 provides a heuristic view of a repository according to the present invention.

In FIG. 10, an Airbill 1000 is being defined by customizing a generic purchase order DTD 1001, adding more specific information about shipping weight 1002. The generic purchase order 1001 was initially assembled from the ground up out of CBL modules for address, date and time, currency, and vendor and product description. Using CBL thus significantly speeds the development and implementation of XML commerce applications. More importantly, CBL makes it easier for commercial applications to be interconnected.

In the CBL, XML is extended with a schema. The extensions add strong-typing to XML elements so that content can be readily validated. For example, an element called <CPU_clock_speed> can be defined as an integer with a set of valid values: {100, 133, 166, 200, 233, 266 Mhz.}. The schema also adds class-subclass hierarchies, so that information can be readily instantiated from class definitions. A laptop, for instance, can be described as a computer with additional tags for features such as display type and battery life. These and other extensions facilitate data entry, as well as automated translations between XML and traditional Object-Oriented and relational data models.

Thus the completed BID is run through the compiler which produces the DTDs for the actual instance of a participant and a service as outlined above, the JAVA beans which correspond to the logical structures in the DTD instances, and transformation code for transforming from XML to JAVA and from JAVA to XML. In alternative systems documentation is also generated for display on a user interface or for printing by a user to facilitate use of the objects.

For the example market participant and service DTDs set forth above, the JAVA beans generated by the compiler are set forth (with some redactions for conciseness) as follows:

```
        import com.veo.vsp.doclet.meta.Document;
public class AddressPhysical extends Document {
        public static final String DOC_TYPE = "address.physical";
          String mStreet;
          String mCity;
        public final static int AK = 0;
        public final static int AL = 1;
        public final static int AR = 2;
        public final static int AZ = 3;
        public final static int CA = 4;
        . . .
        public final static int WI = 48;
        public final static int WV = 49;
        public final static int WY = 50;
          int mState;
          String mPostcode;
        public final static int AD = 51;
        public final static int AB = 52;
        public final static int AF = 53;
        public final static int AG = 54;
        public final static int AI = 55;
        public final static int AM = 56;
        . . .
        int mCountry;
        public AddressPhysical( ){
                super(DOC_TYPE);
        mStreet = new String( );
        mCity = new String( );
                this.mState = -1;
        mPostcode = null;
                this.mCountry = -1;
        }
        public AddressPhysical(String doc_type) {
                super(doc_type);
        mStreet = new String( );
        mCity = new String( );
                this.mState = -1;
        mPostcode = null;
                this.mCountry = -1;
        }
        static public AddressPhysical initAddressPhysical(String iStreet,String iCity,int
iState,String iPostcode,int iCountry){
                AddressPhysical obj = new AddressPhysical( );
                obj.initiaiizeAll(iStreet, iCity, iState, iPostcode, iCountry);
                return obj;
        }
        public void initializeAll(String iStreet,String iCity,int iState,String iPostcode,int
iCountry){
                mStreet = iStreet;
                mCity = iCity;
                mState = iState;
                mPostcode = iPostcode;
                mCountry = iCountry;
        }
        public String getStreet( ){
          return mStreet;
        }
        public String getStreetToXML( ){
                if (getStreet( ) == null) return null;
                char [ ]c = getStreet( ).toCharArray( );
                StringBuffer sb = new StringBuffer( );
                for (int x = 0; x < c.length; x++){
                  switch(c[x]){
                  case'>':
                    sb.append(">");
                    break;
                  case'<':
                    sb.append("<");
                    break;
                  case '&':
                    sb.append("&");
                    break;
                  case""":
                    sb.append(""");
                    break;
                  case "\"
                    sb.append(""");
                    break;
                  default:
```

-continued

```
                if (Character.isDefined(c[x]))
                  sb.append(c[x]);
              }
            }
            return sb.toString( );
    }
    public void setStreet(String inp) {
            this.mStreet = inp;
    }
    public void streetFromXML(String n){
            setStreet(n);
    }
    public String getCity( ){
     return mCity;
    }
    public String getCityToXML( ){
            if (getCity( ) == null) return null;
            char [ ] c = getCity( ).toCharArray( );
            StringBuffer sb = new StringBuffer( );
            for (intx= 0;x < c.length;x++){
              switch(c[x]){
               case '>':
                sb. append(">");
                break;
               case '<':
                sb.append("<");
                break;
               case '&':
                sb.append("&");
                break;
               case """:
                sb.append(""");
                break;
               case "\":
                sb.append(""");
                break;
               default:
                if (Character.isDefined(c[x]))
                  sb.append(c[x]);
              }
            }
            return sb.toString( );
    }
    public void setCity(String inp) {
            this.mCity = inp;
    }
    public void cityFromXML (String n){
            setCity(n);
    }
    public int getState( ){
     return mState;
    }
    public String getStateToXML( ){
            switch (mState) {
                    case AK return "AK",
                    case AL return "AL",
                    case AR return "AR";
                    case AZ return "AZ",
                    . . .
            }
     return null;
    }
    public void setState(int inp){
            this.mState = inp;
    }
    public void stateFromXML(String s){
            if(s.equals("AK"))mState = AK;
            else if (s.equals("AL"))mState = AL,
            else if (s.equals("AR"))mState = AR,
            else if (s.equals("AZ"))mState = AZ,
            . . .
    }
    public String getPostcode( ){
     return mPostcode;
    }
    public String getPostcodeToXML( ){
            if (getPostcode( ) == null) return null;
            char [ ]c = getPostcode( ).toCharArray( );
            StringBuffer sb = new StringBuffer( );
```

```
                for (int x = 0; x < c.length; x++){
                  switch(c[x]){
                  case '>':
                    sb.append(">");
                    break;
                   case '<':
                    sb.append("<");
                    break;
                   case '&':
                    sb.append("&");
                    break;
                   case
                    sb. append(""");
                    break;
                   case "\":
                    sb.append(""");
                    break;
                   default:
                     if (Character.isDefined(c[x]))
                       sb.append(c[x]);
                   }
                 }
                return sb.toString( );
        }
        public void setPostcode(String inp) {
                this.mPostcode = inp,
        }
        public void PostcodeFromXML(String n){
                setPostcode(n);
        public int getCountry( ){
          return mCountry;
        }
        public String getCountryToXML( ){
                switch (mCountry){
                        case AD: return "AD";
                        case AE return "AE",
                        case AF: return "AF",
                        . . .
                }
          return null;
        }
        public void setCountry(int inp) {
                this.mCountry = inp;
        }
        public void countryFromXML(String s){
                if(s.equals("AD"))mCountry = AD;
                else if (s.equals("AE"))mCountry = AE;
                else if (s.equals("AF"))mCountry = AF;
                else if (s.equals("AG"))mCountry = AG;
                else if (s.equals("AI"))mCountry = AI;
                . .
        }
 }
}
package com.veo.xdk.dev.schema.test.blib;
import com.veo.vsp.doclet.meta.Document;
public class AddressSet extends Document {
        public static final String DOC_TYPE = "address.set";
          AddressPhysical mAddressPhysical;
          String [ ] mTelephone;
          String [ ] mFax;
          String [ ] mEmail;
          String [ ] mInternet;
        public AddressSet( ){
                super(DOC_TYPE);
                this.mAddressPhysical = new AddressPhysical( );
        mTelephone = null;
        mFax = null;
        mEmail = null;
        mInternet = null;
        }
        public AddressSet(String doc_type){
                super(doc_type);
                this.mAddressPhysical = new AddressPhysical( );
        mTelephone = null;
        mFax = null;
        mEmail = null;
        mInternet = null;
        }
        static public AddressSet initAddressSet(AddressPhysical iAddressPhysical,String [ ]
```

-continued

```
iTelephone,String [ ] iFax,String [ ] iEmail,String [ ] iInternet){
                AddressSet obj = new AddressSet( );
                obj.initializeAll(iAddressPhysical, iTelephone, iFax, iEmail, iInternet);
                return obj;
        }
        public void initializeAll(AddressPhysical iAddressPhysical,String [ ] iTelephone,String [ ]
iFax,String [ ] iEmail,String [ ] iInternet){
                mAddressPhysical = IAddressPhysical;
                mTelephone = iTelephone;
                mFax = iFax;
                mEmail = iEmail;
                mInternet = iInternet;
        }
        public AddressPhysical getAddressPhysical( ){
          return mAddressPhysical;
        }
        public void setAddressPhysical(AddressPhysical inp) {
                this.mAddressPhysical = inp;
        }
        public String [ ] getTelephone( ){
          return mTelephone;
        }
        public String getTelephone(int index){
                if (this.mTelephone == null)
                  return null;
                if (index >= this.mTelephone.length)
                  return null;
                if (index < 0 && -index > this.mTelephone.length)
                  return null;
                if(index >= 0) return this.mTelephone[index];
                return this.mTelephone[this.mTelephone.length + index];
        }
        public String [ ] getTelephoneToXML( ){
                String [ ] valArr = getTelephone( );
                if (valArr == null) return null;
                String [ ] nvArr = new String[valArr.length];
                for (int z = 0; z < nvArr.length; z++){
                  char [ ] c = valArr[z].toCharArray( );
                  StringBuffer st = new StringBuffer( );
                  StringBuffer sb = new StringBuffer( );
                  for (int x = 0; x < c.length; x++){
                    switch(c[x]){
                    case '>':
                      sb.append(">");
                      break;
                    case '<':
                      sb.append("<");
                      break;
                    case '&':
                      sb.append("&");
                      break;
                    case '"':
                      sb.append(""");
                      break;
                    case '"':
                      sb.append(""");
                      break;
                    default:
                      if (Character.isDefined(c[x]))
                        sb.append(c[x]);
                    }
                  }
                  nvArr[z] = sb.toString( );
                }
                return nvArr;
        }
        public void setTelephone(int index, String inp){
          if (this.mTelephone == null) {
            if(index< 0) {
              this.mTelephone = new String[1];
                this.mTelephone[0] = inp;
            } else {
              this.mTelephone = new String[index + 1];
                this.mTelephone[index] = inp;
            }
          } else if (index < 0) {
                        String [ ] newTelephone = new String[this.mTelephone.length + 1];
                        java.lang.System.arraycopy((Object)mTelephone, 0,
(Object)newTelephone, 0, this.mTelephone.length);
```

```
                              newTelephone[newTelephone.length – 1] = inp;
                              mTelephone = newTelephone;
                } else if (index >= this.mTelephone.length) {
                              String [ ] newTelephone = new String[index + 1];
                              java.lang.System.arraycopy((Object)mTelephone, 0,
(Object)newTelephone, 0, this.mTelephone.length);
                              newTelephone[index] = inp;
                              mTelephone = newTelephone;
                } else {
                              this.mTelephone[index] = inp;
                }
      }
      public void setTelephone(String [ ] inp) {
                this.mTelephone = inp;
      }
      public void telephoneFromXML(String n){
                setTelephone(–1, n);
      }
      public String [ ] getFax( ){
        return mFax;
      }
      public String getFax(int index) {
                if (this.inFax == null)
                  return null;
                if (index >= this.mFax.length)
                  return null;
                if (index < 0 && –index > this.mFax.length)
                  return null;
                if (index >= 0) return this.mFax[index];
                return this.mFax[this.mFax.length + index];
      }
      public String [ ] getFaxToXML( ){
                String [ ] valArr = getFax( );
                if (valArr == null) return null;
                String [ ] nvArr = new String[valArr.length];
                for (int z = 0; z < nvArr.length; z++){
                  char [ ] c = valArr[z].toCharArray( );
                  StringBuffer st = new StringBuffer( );
                  StringBuffer sb = new StringBuffer( );
                  for (int x = 0; x < c.length; x++){
                    switch(c[x]) {
                    case '>':
                      sb.append(">");
                      break;
                    case '<':
                      sb.append("<");
                      break;
                    case '&':
                      sb.append("&");
                      break;
                    case '"':
                      sb.append(""");
                      break;
                    case '"':
                      sb.append(""");
                      break;
                    default:
                      if (Character.isDefined(c[x]))
                        sb.append(c[x]);
                    }
                  }
                  nvArr[z] = sb.toString( );
                }
                return nvArr;
      }
      public void setFax(int index, String inp){
          if (this.mFax == null) {
                    if(index < 0) {
                      this.mFax = new String[1];
                      this.mFax[0] = inp;
                    } else {
                      this.mFax = new String[index + 1];
                      this.mFax[index] = inp;
                    }
          } else if (index < 0) {
                              String [ ] newFax = new String[this.mFax.length + 1];
                              java.lang.System.arraycopy((Object)mFax, 0, (Object)newFax, 0,
this mFax.length);
                              newFax[newFax.length 1] = inp;
```

```
                    mFax = newFax;
            } else if(index >= this.mFax.length){
                    String [ ] newFax = new String[index + 1];
                    java.lang.System.arraycopy((Object)mFax, 0, (Object)newFax, 0,
this.mFax.length);
                    newFax[index] = inp;
                    mFax = newFax;
            } else {
                    this.mFax[index] = inp;
            }
    }
    public void setFax(String [ ] inp){
            this.mFax = inp;
    }
    public void faxFromXML(String n){
            setFax(-1, n);
    }
    public String [ ] getEmail( ){
      return mEmail;
    }
    public String getEmail(int index){
            if (this.Email == null)
              return null;
            if (index >= this.mEmail.length)
              return null;
            if (index <0 && -index > this.mEmail.length)
              return null;
            if (index >= 0) return this.mEmail[index];
            return this.mEmail[this.mEmail.length + index];
    }
    public String [ ] getEmailToXML( ){
            String [ ] valArr = getEmail( );
            if (valArr == null) return null;
            String [ ] nvArr = new String[valArr.length];
            for (int z = 0; z < nvArr.length; z++){
             char [ ] c = valArr[z].toCharArray( );
             StringBuffer st = new StringBuffer( );
             StringBuffer sb = new StringBuffer( );
             for (int x = 0; x < c.length; x++){
              switch(c[x]){
               case '>':
                sb.append(">");
                break;
               case '<':
                sb. append("<");
                break;
               case '&':
                sb.append("&");
                break;
               case"'":
                sb.append(""");
                break;
               case '"':
                sb.append(""");
                break;
               default:
                if (Character.isDefined(c[x]))
                 sb.append(c[x]);
              }
             }
             nvArr[z] = sb.toString( );
            }
            return nvArr;
    }
    public void setEmail(int index, String inp){
            if (this.mEmail == null) {
              if(index < 0) {
               this.mEmail = new String[1];
               this.mEmail[0] = inp;
              } else {
               this.mEmail = new String[index + 1];
               this.mEmail[index] = inp;
              }
            } else if (index < 0) {
                    String [ ] newEmail = new String[this.mEmail.length + 1];
                    java.lang.System.arraycopy((Object)mEmail, 0, (Object)newEmail, 0,
this mEmail.length);
                    newEmail[newEmail.length – 1] = inp;
                    mEmail = newEmail;
```

-continued

```
                } else if (index >= this.mEmail.length){
                        String [ ] newEmail = new String[index + 1];
                        java.lang.System.arraycopy((Object)mEmail, 0, (Object)newEmail, 0, this.mEmail.length);
                        newEmail[index] = inp;
                        mEmail = newEmail;
                } else {
                        this.mEmail[index] = inp;
                }
        }
        public void setEmail(String [ ] inp){
                this.mEmail = inp;
        }
        public void emailFromXML(String n){
                setEmail(-1, n);
        }
        public String [ ] getInternet( ){
          return mInternet;
        }
        public String getInternet(int index){
                if (this.mInternet = null)
                  return null;
                if (index >= this.mInternet.length)
                  return null;
                if (index < 0 && -index > this.mInternet.length)
                  return null;
                if (index >= 0) return this.mInternet[index];
                return this.mInternet[this.mInternet.length + index];
        }
        public String [ ] getInternetToXML( ){
                String [ ] valArr = getinternet( );
                if (valArr == null) return null;
                String [ ] nvArr = new String[valArr.length];
                for (int z = 0; z < nvArr.length; z++){
                  char [ ] c = valArr[z].toCharArray( );
                  StringBuffer st = new StringBuffer( );
                  StringBuffer sb = new StringBuffer( );
                  for (int x = 0; x < c.length; x++){
                    switch(c[x]){
                    case '>':
                      sb.append(">");
                      break;
                    case '<':
                      sb.append("<");
                      break;
                    case '&':
                      sb.append("&");
                      break;
                    case""":
                      sb.append(""");
                      break;
                    case '"':
                      sb.append(""");
                      break;
                    default:
                      if (Character.isDefined(c[x]))
                        sb.append(c[x]);
                    }
                  }
                  nvArr[z] = sb.toString( );
                }
                return nvArr;
        }
        public void setInternet(int index, String inp){
            if(this.mInternet == null) {
                if(index < 0) {
                  this.mInternet = new String[1];
                  this.mInternet[0] = inp;
                } else {
                  this.mInternet = new String[index + 1];
                  this.mInternet[index] = inp;
                }
            } else if (index < 0) {
                        String [ ] newInternet = new String[this.mInternet.length + 1];
                        java.lang.System.arraycopy((Object)mInternet, 0, (Object)newInternet, 0, this.mInternet.length);
                        newInternet[newInternet.length - 1] = inp;
                        mInternet = newInternet,
                } else if (index >= this.mInternetlength){
```

-continued

```
                              String [ ] newInternet = new String[index + 1];
                              java.lang.System.arraycopy((Object)mInternet, 0, (Object)newInternet,
0, this.mInternet.length);
                              newInternet[index] = inp;
                              mInternet = newInternet;
                    } else {
                              this.mInternet[index] = inp;
                    }
          }
          public void setInternet(String [ ] inp){
                    this.mInternet = inp;
          }
          public void internetFromXML(String n){
                    setInternet(-1, n);
          }
}
package com.veo.xdk.dev.schema.test.blib;
iraport com.veo.vsp.doclet.meta.Document;
public class Business extends Party {
          public static final String DOC_TYPE = "business";
          String aBusinessNumber;
          public Business( ){
                    super(DOC_TYPE);
          aBusinessNumber = new String( );
          }
          public Business(String doc_type){
                    super(doc_type);
          aBusinessNumber = new String( );
          }
          static public Business intBusiness(String iBusinessNumber,String [ ]
iPartyName,AddressSet iAddressSet){
                    Business obj = new Business( );
                    obj.initializeAll(iBusinessNumber, iPartyName, iAddressSet);
                    return obj;
          }
          public void initializeAll(String iBusinessNumber,String [ ] iPartyName,AddressSet
iAddressSet){
                    aBusinessNumber = iBusinessNumber;
                    super.initializeAll(iPartyName, iAddressSet);
          }
          public String getBusinessNumber( ) {
            return aBusinessNumber;
          }
          public String getBusinessNumberToXML( ){
                    if (getBusinessNumber( ) == null) return null;
                    char [ ] c = getBusinessNumber( ).toCharArray( );
                    StringBuffer sb = new StringBuffer( );
                    for (int x = 0; x < c.length; x++){
                     switch(c[x]) {
                     case '>':
                       sb.append(">");
                       break;
                     case '<':
                       sb.append("<");
                       break;
                     case '&':
                       sb.append("&");
                       break;
                     case""":
                       sb.append(""");
                       break;
                     case "\'":
                       sb.append(""");
                       break;
                     default:
                       if (Character.isDefined(c[x]))
                         sb.append(c[x]);
                     }
                    }
                    return sb.toString( );
          }
          public void setBusinessNumber(String inp){
                    this.aBusinessNumber = inp;
          }
          public void businessNumberFromXML(String n){
                    setBusinessNumber(n);
          }
}
import com.veo.vsp.doclet.meta.Document;
```

-continued

```
public class Party extends Document {
        public static final String DOC_TYPE = "party";
        String [ ] mPartyName;
        AddressSet mAddressSet;
        public Party( ){
                super(DOC_TYPE);
    mPartyName = new String[0];
                this.mAddressSet = new AddressSet( );
        }
        public Party(String doc_type){
                super(doc_type);
    mPartyName = new String[0];
                this.mAddressSet = new AddressSet( );
        }
        static public Party initParty(String [ ] iPartyName,AddressSet iAddressSet){
        Party obj = newParty( );
        obj.initializeAll(iPartyName, iAddressSet);
        return obj;
        }
        public void initializeAll(String [ ] iPartyName,AddressSet iAddressSet){
                mPartyName = iPartyName;
                mAddressSet = iAddressSet;
        }
        public String [ ] getPartyName( ){
          return mPartyName;
        }
        public String getPartyName(int index){
                if(this.mPartyName = null)
                  return null;
                if (index >= this.mPartyName.length)
                  return null;
                if (index < 0 && −index> this.mPartyName.length)
                  return null;
                if (index >= 0) return this.mPartyName[index];
                return this.mPartyName[this.mPartyName.length + index];
        }
        public String [ ] getPartyNameToXML( ){
                String [ ] valArr = getPartyName( );
                if (valArr == null) return null;
                String [ ] nvArr = new String[valArr.length];
                for (int z = 0; z < nvArr.length; z++){
                char [ ] c = valArr[z].toCharArray( );
                StringBuffer st = new StringBuffer( );
                StringBuffer sb = new StringBuffer( );
                for (int x = 0; x < c.length; x++){
                  switch(c[x]) {
                  case '>':
                   sb.append(">");
                   break;
                  case '<':
                   sb.append("<");
                   break;
                  case '&':
                   sb.append("&");
                   break;
                  case '"':
                   sb.append(""");
                   break;
                  case '"':
                   sb.append(""");
                   break;
                  default:
                   if (Character.isDefined(c[x]))
                    sb.append(c[x]);
                  }
                }
                nvArr[z] = sb.toString( );
                }
                return nvArr;
        }
        public void setPartyName(int index, String inp){
           if(this.mPartyName ==null) {
                  if(index < 0) {
                   this.mPartyName = new String[1];
                   this.mPartyName[0] = inp;
                  } else {
                   this.mPartyName = new String[index + 1];
                   this.mPartyName[index] = inp;
                  }
```

```
                } else if (index < 0) {
                        String [ ] newPartyName = new String[this.mPartyName.length + 1];
                        java.lang.System.arraycopy((Object)mPartyName, 0,
(Object)newPartyName, 0, this.mPartyName.length);
                        newPartyName[newPartyName.length - 1] = inp;
                        mPartyName = newPartyName;
                } else if (index >= this.mPartyName.length){
                String [ ] newPartyName = new String[index + 1];
                java.lang.System.arraycopy((Object)mPartyName, 0,
(Object)newPartyName, 0, this.mPartyName.length);
                        newPartyName[index] = inp;
                        mPartyName = newPartyName;
                } else {
                        this.mPartyName[index] = inp;
                }
        }
        public void setPartyName(String [ ] inp){
                this.mPartyName = inp;
        }
        public void PartyNameFromXML(String n){
                setPartyName(-1, n);
        }
        public AddressSet getAddressSet( ){
          return mAddressSet;
        }
        public void setAddressSet(AddressSet inp){
                this.mAddressSet = inp;
        }
}
package com.veo.xdk.dev.schema.test.blib;
import com.veo.vsp.doclet.meta.Document;
public class Person extends Party {
        public static final String DOC_TYPE = "person";
          String aSSN;
        public Person( ){
                super(DOC_TYPE);
        aSSN = null;
        }
        public Person(String doc_type){
                super(doc_type);
        aSSN = null;
        }
        static public Person initPerson(String iSSN,String [ ] iPartyName,AddressSet
iAddressSet){
                Person obj = new Person( );
                obj.initializeAll(iSSN, iPartyName, iAddressSet);
                return obj;
        }
        public void initializeAll(String iSSN,String [ ] iPartyName,AddressSet iAddressSet){
                aSSN = iSSN;
                super.initializeAll(iPartyName, iAddressSet);
        }
        public String getSSN( ){
          return aSSN;
        }
        public String getSSNToXML( ){
                if (getSSN( ) == null) return null;
                char [ ] c = getSSN( ).toCharArray( );
                StringBuffer sb = new StringBuffer( );
                for (int x = 0; x < c.length; x++){
                  switch(c[x]){
                  case '>':
                    sb.append(">");
                    break;
                  case '<':
                    sb.append("<");
                    break;
                  case
                    sb.append("&");
                    break;
                  case "'":
                    sb.append(""");
                    break;
                  case "\":
                    sb.append(""");
                    break;
                  default:
                    if (Character.isDefined(c[x]))
                      sb.append(c[x]);
```

-continued

```
                }
            }
            return sb.toString( );
        }
        public void setSSN(String inp){
            this.aSSN = inp;
        }
        public void sSNFromXML(String n){
            setSSN(n);
        }
    }
}
package com.veo.xdk.dev.schema.test.blib;
import com.veo.vsp.doclet.meta.Document;
public class PrototypeService extends Document {
    public static final String DOC_TYPE = "prototype.service";
     String mServiceName;
     String [ ] mServiceTerms;
     String [ ] mServiceLocation;
     ServiceOperation [ ] mServiceOperation;
    public PrototypeService( ){
            super(DOC_TYPE);
    mServiceName = new String( );
    mServiceTerms = new String[0];
    mServiceLocation = new String[0];
            this.mServiceOperation = new ServiceOperation[0];
    }
    public PrototypeService(String doc_type){
            super(doc_type);
    mServiceName = new String( );
    mServiceTerms = new String[0];
    mServiceLocation = new String[0];
            this.mServiceOperation = new ServiceOperation[0];
    }
    static public PrototypeService initPrototypeService(String iServiceName,String [ ]
iServiceTerms,String [ ] iServiceLocation,ServiceOperation [ ] iServiceOperation){
            PrototypeService obj = new PrototypeService( );
            obj.initializeAll(iServiceName, iServiceTerms, iServiceLocation,
iServiceOperation);
            return obj;
    }
    public void initializeAll(String iServiceName,String [ ] iServiceTerms,String [ ]
iServiceLocation,ServiceOperation [ ] iServiceOperation){
            mServiceName = iServiceName;
            mServiceTerms = iServiceTerms;
            mServiceLocation = iServiceLocation;
            mServiceOperation = iServiceOperation;
    }
    public String getServiceName( ){
      return mServiceName;
    }
    public String getServiceNameToXML( ){
            if (getServiceName( ) == null) return null;
            char [ ] c = getServiceName( ).toCharArray( );
            StringBuffer sb = new StringBuffer( );
            for (int x = 0; x <c.length; x++){
              switch(c[x]){
                case
                  sb.append(">");
                  break;
                case '<':
                  sb.append("<");
                  break;
                case '&':
                  sb.append("&");
                  break;
                case "'":
                  sb.append(""");
                  break;
                case "\":
                  sb.append(""");
                  break;
                default:
                  if (Character.isDefined(c[x]))
                  sb.append(c[x]);
              }
            }
            return sb.toString( );
    }
    public void setServiceName(String inp) {
```

```
            this.mServiceName = inp;
    }
    public void serviceNameFromXML(String n){
            setServiceName(n);
    }
    public String [ ] getServiceTerms( ){
      return mServiceTerms;
    }
    public String getServiceTerms(int index){
            if (this.mServiceTenns == null)
             return null;
            if (index >= this.mServiceTerms.length)
             return null;
            if (index < 0 && -index > this.mServiceTerms.length)
             return null;
            if (index >= 0) return this.mServiceTerms[index];
            return this.mServiceTerms[this.mServiceTerms.length + index];
    }
    public String [ ] getServiceTermsToXML( ){
            String [ ] valArr = getServiceTerms( );
            if (valArr == null) return null;
            String [ ] nvArr = new String[valArr.length];
            for (int z = 0; z < nvArr.length; z++){
              char [ ] c = valArr[z].toCharArray( );
              StringBuffer st = new StringBuffer( );
              StringBuffer sb = new StringBuffer( );
              for (int x = 0; x < c.length; x++){
               switch(c[x]) {
                case '>':
                  sp.append(">");
                  break;
                case "<":
                  sb.append("<");
                  break;
                case '&':
                  sb.append("&");
                  break;
                case """:
                  sb.append(""");
                  break;
                case '"':
                  sb.append(""");
                  break;
                default:
                  if (Character.isDefined(c[x]))
                   sb.append(c[x]);
               }
              }
              nvArr[z] = sb.toString( );
            }
            return nvArr;
    }
    public void setServiceTerms(int index, String inp){
        if (this.mServiceTerms == null) {
            if(index < 0) {
              this.mServiceTerms = new String[1];
              this.mServiceTerms[0] = inp;
            } else {
              this.mServiceTerms = new String[index + 1];
              this.mServiceTerms[index] = inp;
            }
        } else if(index < 0) {
                    String [ ] newServiceTerms = new String[this.mServiceTenns.length +
1];
                    java.lang.System.arraycopy((Object)mServiceTerms, 0,
(Object)newServiceTerms, 0, this.mServiceTerms.length);
                    newServiceTerms[newServiceTerms.length - 1] = inp;
                    mServiceTerms = newServiceTerms;
            } else if (index >= this.mServiceTerms.length){
                    String [ ] newServiceTerms = new String[index + 1];
                    java.lang.System.arraycopy((Object)mServiceTerms, 0,
(Object)newServiceTerms, 0, this.mServiceTerms.length);
                    newServiceTerms[index] = inp;
                    mServiceTerms = newServiceTerms;
            } else {
                    this.mServiceTerms[index] = inp;
            }
    }
    public void setServiceTerms(String [ ] inp){
```

```
                this.mServiceTerms = inp;
        }
        public void ServiceTermsFromXML(String n){
                setServiceTerms(-1, n);
        }
        public String [ ] getServiceLocation( ){
          return mServiceLocation;
        }
        public String getServiceLocation(int index){
                if (this.mServiceLocation == null)
                  return null;
                if (index >= this.mServiceLocation.length)
                  return null;
                if (index < 0 && -index > this.mServiceLocation.length)
                  return null;
                if (index >= 0) return this.mServiceLocation[index];
                return this.mServiceLocation[this.mServiceLocation.length + index];
        }
        public String [ ] getServiceLocationToXML( ){
                String [ ] valArr = getServiceLocation( );
                if (valArr == null) return null;
                String [ ] nvArr = new String[valArr.length];
                for (int z = 0; z < nvArr.length; z++){
                  char [ ] c = valArr[z].toCharArray( );
                  StringBuffer st = new StringBuffer( );
                  StringBuffer sb = new StringBuffer( );
                  for (int x = 0; x < c.length; x++){
                    switch(c[x]) {
                    case '>':
                      sb.append(">");
                      break;
                    case '<':
                      sb.append("<");
                      break;
                    case '&':
                      sb.append("&");
                      break;
                    case '"':
                      sb.append(""");
                      break;
                    case '"':
                      sb.append(""");
                      break;
                    default:
                      if (Character.isDefined(c[x]))
                        sb.append(c[x]);
                    }
                  }
                  nvArr[z] = sb.toString( );
                }
                return nvArr;
        }
        public void setServiceLocation(int index, String inp){
            if (this.mServiceLocation == null) {
                if(index < 0) {
                  this.mServiceLocation = new String[1];
                  this.mServiceLocation[0] = inp;
                } else {
                  this.mServiceLocation = new String[index + 1];
                  this.mServiceLocation[index] = inp;
                }
            } else if (index < 0) {
                        String [ ] newServiceLocation = new
String[this.mServiceLocation.length + 1];
                        java.lang.System.arraycopy((Object)mServiceLocation, 0,
(Object)newServiceLocation, 0, this.mServiceLocation.length);
                        newServiceLocation[newServiceLocation.length - 1] = inp;
                        mServiceLocation = newServiceLocation;
                } else if (index >= this.inServiceLocation.length){
                        String [ ] newServiceLocation = new String[index + 1];
                        java.lang.System.arraycopy((Object)mServiceLocation, 0,
(Object)newServiceLocation, 0, this.mServiceLocation.length);
                        newServiceLocation[index] = inp;
                        mServiceLocation = newServiceLocation;
                } else {
                        this.mServiceLocation[index] = inp;
                }
        }
        public void setServiceLocation(String [ ] inp){
```

```
                this.mServiceLocation = inp;
        }
        public void serviceLocationFromXML(String n){
                setServiceLocation(-1, n);
        }
        public ServiceOperation [ ] getServiceOperation( ){
          return mServiceOperation;
        }
        public ServiceOperation getServiceOperation(int index) {
                if (this.mServiceOperation == null)
                  return null;
                if (index >= this.mServiceOperation.length)
                  return null;
                if(index <0 && -index > this.mServiceOperation.length)
                  return null;
                if(index >= 0) return this.mServiceOperation[index];
                return this.mServiceOperation[this.mServiceOperation.length + index];
        }
        public void setServiceOperation(int index ServiceOperation inp) {
            if (this.mServiceOperation == null) {
                if(index < 0) {
                  this.mServiceOperation = new ServiceOperation∂inex + 1];
                  this.mServiceOperation[0] = inp;
                } else {
                  this.mServiceOperation = new ServiceOperation[index + 1];
                  this.mServiceOperation[index] = inp;
                }
            } else if (index < 0) {
                        ServiceOperation [ ] newServiceOperation = new
ServiceOperation[this.mServiceOperation.length + 1];
                        java.lang.System.arraycopy((Object)mServiceOperation, 0,
(Object)newServiceOperation, 0, this.mServiceOperation.length);
                        newServiceOperation[newServiceOperation.length - 1] = inp;
                        mServiceOperation = newServiceOperation;
                } else if (index >= this.mServiceOperation.length){
                        ServiceOperation [ ] newServiceOperation = new
ServiceOperation[index + 1];
                        java.lang.System.arraycopy((Object)mServiceOperation, 0,
(Object)newServiceOperation, 0, this.mServiceOperation.length);
                        newServiceOperation[index] = inp;
                        mServiceOperation = newServiceOperation;
                } else {
                        this.mServiceOperation[index] = inp;
                }
        }
        public void setServiceOperation(ServiceOperation [ ] inp){
                this.mServiceOperation = inp;
        }
}
package com.veo.xdk.dev.schema.test.blib;
import com.veo.vsp.doclet.meta.Document;
public class Service extends Document {
        public static final String DOC_TYPE = "service";
          String mServiceName;
          String mServiceLocation;
          ServiceOperation [ ] mServiceOperation;
          String mServiceTerms;
        public Service( ){
                super(DOC_TYPB);
          mServiceName = new String( );
          mServiceLocation = new String( );
                this.mServiceOperation = new ServiceOperation[0];
          mServiceTerms = new String( );
        }
        public Service(String doc_type){
                super(doc_type);
          mServiceName = new String( );
          mServiceLocation = new String( );
                this.mServiceOperation = new ServiceOperation[0];
          mServiceTerms = new String( );
        }
        static public Service initService(String iServiceName,String
iServiceLocation,ServiceOperation [ ] iServiceOperation,String iServiceTerms){
                Service obj = new Service( );
                obj.initializeAll(iServiceName, iServiceLocation, iServiceOperation,
iServiceTerms);
                return obj;
        }
        public void initializeAll(String iServiceName,String iServiceLocation,ServiceOperation
```

```
[ ] iServiceOperation,String iServiceTerms) {
            mServiceName = iServiceName;
            mServiceLocation = iServiceLocation;
            mServiceOperation = iServiceOperation;
            mServiceTerms = iServiceTerms;
    }
    public String getServiceName( ){
      return mServiceName;
    }
    public String getServiceNameToXML( ){
            if (getServiceName( ) == null) return null;
            char [ ] c = getServiceName( ).toCharArray( );
            StringBuffer sb = new StringBuffer( );
            for (int x = 0; x < c.length; x++){
              switch(c[x]){
              case '>':
                sb.append(">");
                break;
              case '<':
                sb.append("<");
                break;
              case '&':
                sb.append("&");
                break;
              case """:
                sb.append(""");
                break;
              case 'Δ':
                sb.append(""");
                break;
              default:
                if (Character.isDefined(c[x]))
                  sb.append(c[x]);
              }
            }
            return sb.toString( );
    }
    public void setServiceName(String inp){
            this.mServiceName = inp;
    }
    public void serviceNameFromXML(String n){
            setServiceName(n);
    }
    public String getServiceLocation( ){
      return mServiceLocation;
    }
    public String getServiceLocationToXML( ){
            if (getServiceLocation( ) == null) return null;
            char [ ] c = getServiceLocation( ).toCharArray( );
            StringBuffer sb = new StringBuffer( );
            for(int x = 0; x < c.length; x++){
              switch(c[x]){
              case '>':
                sb.append(">");
                break;
              case '<':
                sb.append("<");
                break;
              case '&':
                sb.append("&");
                break;
              case """:
                sb.append(""");
                break;
              case "\":
                sb.append(""");
                break;
              default:
                if (Character.isDefined(c[x]))
                  sb.append(c[x]);
              }
            }
            return sb.toString( );
    }
    public void setServiceLocation(String inp){
            this.mServiceLocation = inp;
    }
    public void serviceLocationFromXML(String n){
            setServiceLocation(n);
```

-continued

```
    }
    public ServiceOperation [ ] getServiceOperation( ){
      return mServiceOperation;
    }
    public ServiceOperation getServiceOperation(int index) {
            if (this.mServiceOperation == null)
              return null;
            if (index >= this.mServiceOperation.length)
              return null;
            if (index < 0 && -index > this.mServiceOperation.length)
              return null;
            if (index >= 0) return this.mServiceOperation[index];
            return this.mServiceOperation[this.mServiceOperation.length + index];
    }
    public void setServiceOperation(int index, ServiceOperation inp){
        if (this.mServiceOperation = null) {
            if(index < 0) {
              this.mServiceOperation = new ServiceOperation[1];
              this.mServiceOperation[0] = inp;
            } else {
              this.mServiceOperation = new ServiceOperation[index + 1];
              this.mServiceOperation[index] = inp;
            }
        } else if (index < 0) {
                    ServiceOperation [ ] newServiceOperation = new
ServiceOperation[this.mServiceOperation.length + 1];
                    java.lang.System.arraycopy((Object)mServiceOperation, 0,
(Object)newServiceOperation, 0, this.mServiceOperation.length);
                    newServiceOperation[newServiceOperation.length - 1] = inp;
                    mServiceOperation = newServiceOperation;
            } else if (index >= this.mServiceOperation.length){
                    ServiceOperation [ ] newServiceOperation = new
ServiceOperation[index + 1];
                    java.lang.System.arraycopy((Object)mServiceOperation, 0,
(Object)newServiceOperation, 0, this.mServiceOperation.length);
                    newServiceOperation[index] = inp;
                    mServiceOperation = newServiceOperation;
            } else {
                    this.mServiceOperation[index] = inp;
            }
    }
    public void setServiceOperation(ServiceOperation [ ] inp){
            this.mServiceOperation = inp;
    }
    public String getServiceTerms( ) {
      return mServiceTerms;
    }
    public String getServiceTermsToXML( ){
            if (getServiceTerms( ) == null) return null;
            char [ ] c = getServiceTerms( ).toCharArray( );
            StringBuffer sb = new StringBuffer( );
            for (int x = 0; x < c.length; x++){
              switch(c[x]){
                case '>':
                  sb.append(">");
                  break;
                case '<':
                  sb.append("<");
                  break;
                case '&':
                  sb.append("&");
                  break;
                case '"':
                  sb.append(""");
                  break;
                case '\':
                  sb.append(""");
                  break;
                default:
                  if (Character.isDefined(c[x]))
                    sb.append(c[x]);
              }
            }
            return sb.toString( );
    }
    public void setServiceTerms(String inp){
            this.mServiceTerms = inp;
    }
    public void serviceTermsFromXML(String n){
```

-continued

```
                setServiceTerms(n);
        }
}
package com.veo.xdk.dev.schema.test.blib;
import com.veo.vsp.doclet.meta.Document;
public class ServiceOperation extends Document {
        public static final String DOC_TYPE = "service.operation";
         String mServiceOperationName;
         String mServiceOperationLocation;
         String mServiceOperationInput;
         String mServiceOperationOutput;
        public ServiceOperation( ){
                super(DOC_TYPE);
        mServiceOperationName = new String( ),
        mServiceOperationLocation = new String( );
        mServiceOperationInput = new String( ),
        mServiceOperationOutput = new String( ),
        }
        public ServiceOperation(String doc_type) {
                super(doc_type);
                mServiceOperationName = new String( );
                mServiceOperationLocation = new String( ),
                mServiceOperationInput = new String( ),
                mServiceOperationOutput = new String( ),
                }
                static public ServiceOperation initServiceOperation(String
iServiceOperationName,String iServiceOperationLocation,String iServiceOperationInput,String
iServiceOperationOutput){
                ServiceOperation obj = new ServiceOperation( );
                obj.initializeAll(iServiceOperationName, iServiceOperationLocation,
iServiceOperationInput, iServiceOperationOutput);
                return obj;
        }
        public void initializeAll(String iServiceOperationName,String
iServiceOperationLocation,String iServiceOperationinput,String iServiceOperationOutput){
                mServiceOperationName = iServiceOperationName;
                mServiceOperationLocation = iServiceOperationLocation;
                mServiceOperationInput = iServiceOperationInput;
                mServiceOperationOutput = iServiceOperationOutput;
        }
        public String getServiceOperationName( ){
        return mServiceOperationName;
        public String getServiceOperationNameToXML( ){
                if (getServiceOperationName( ) == null) return null;
                char [ ] c = getServiceOperationName( ).toCharArray( );
                StringBuffer sb = new StringBuffer( );
                for (int x = 0; x < c.length; x++){
                  switch(c[x]){
                  case '>':
                    sb.append(">");
                    break;
                  case '<':
                    sb.append("<");
                    break;
                  case '&':
                    sb.append("&");
                    break;
                  case '"':
                    sb.append(""");
                    break;
                  case '\':
                    sb.append(""");
                    break;
                  default:
                    if (Character.isDefined(c[x]))
                     sb.append(c[x]);
                  }
                }
                return sb.toString( );
        }
        public void setServiceOperationName(String inp){
                this.mServiceOperationName = inp;
        }
        public void serviceOperationNameFromXML(String n){
                setServiceOperationName(n);
        }
        public String getServiceOperationLocation( ){
         return mServiceOperationLocation;
        }
```

-continued

```
public String getServiceOperationLocationToXML( ){
        if (getServiceOperationLocation( )= null) return null;
        char [ ] c = getServiceOperationLocation( ).toCharArray( );
        StringBuffer sb = new StringBuffer( );
        for (int x = 0; x < c.length; x++){
         switch(c[x]){
         case '>':
           sb.append(">");
           break;
         case '<':
           sb.append("<");
           break;
         case '&':
           sb.append("&");
           break;
         case '"':
           sb.append(""");
           break;
         case "\"":
           sb.append(""");
           break;
         default:
           if (Character.isDefined(c[x]))
             sb.append(c[x]);
         }
        }
        return sb.toString( );
}
public void setServiceOperationLocation(String inp){
        this.mServiceOperationLocation = inp;
}
public void serviceOperationLocationFromXML(String n){
        setServiceOperationLocation(n);
}
public String getServiceOperationInput( ){
  return mServiceOperationInput;
}
public String getServiceOperationInputToXML( ){
        if (getServiceOperationinput( ) == null) return null;
        char [ ] c = getServiceOperationInput( ).toCharArray( );
        StringBuffer sb = new StringBuffer( );
        for (int x = 0; x < c.length; x++){
         switch(c[x]){
         case '>':
           sb.append(">");
           break;
         case '<':
           sb.append("<");
           break;
         case '&':
           sb.append("&");
           break;
         case '"':
           sb.append(""");
           break;
         case "\"":
           sb.append(""");
           break;
         default:
           if (Character.isDefined(c[x]))
             sb.append(c[x]);
         }
        }
        return sb.toString( );
}
public void setServiceOperationInput(String inp){
        this.mServiceOperationInput = inp;
}
public void serviceOperationInputFromXML(String n){
        setServiceOperationInput(n);
}
public String getServiceOperationOutput( ){
  return mServiceOperationOutput;
}
public String getServiceOperationOutputToXML( ){
        if (getServiceOperationOutput( ) == null) return null;
        char [ ] c = getServiceOperationOutput( ).toCharArray( );
        StringBuffer sb = new StringBuffer( );
        for (int x = 0; x < c.length; x++){
```

-continued

```
                switch(c[x]){
                  case '>':
                    sb.append(">");
                    break;
                  case '<':
                    sb.append("<");
                    break;
                  case '&':
                    sb.append("&");
                    break;
                  case""":
                    sb.append(""");
                    break;
                  case "\":
                    sb.append(""");
                    break;
                  default:
                    if (Character.isDefined(c[x]))
                      sb.append(c[x]);
                  }
                }
                return sb.toString( );
        }
        public void setServiceOperationOutput(String inp){
                this.mServiceOperationOutput = inp;
        }
        public void serviceOperationOutputFromXML(String n){
                setServiceOperationOutput(n);
        }
}
package com.veo.xdk.dev.schema.test.blib;
import com.veo.vsp.doclet.meta.Document;
public class ServiceSet extends Document {
        public static final String DOC_TYPE = "service.set";
        Service [ ] mService;
        public ServiceSet( ){
                super(DOC_TYPE);
                this.mService = new Service[0];
        }
        public ServiceSet(String doc_type){
                super(doc_type);
                this.mService = new Service[0];
        static public ServiceSet initServiceSet(Service [ ] iService) {
                ServiceSet obj = new ServiceSet( );
                obj.initializeAll(iService);
                return obj;
        }
        public void initializeAll(Service [ ] iService) {
                mService = iService;
        }
        public Service [ ] getService( ){
          return mService;
        }
        public Service getService(int index) {
                if (this.mService == null)
                  return null;
                if (index >= this.mService.length)
                  return null;
                if (index <0 && -index>this.mService.length)
                  return null;
                if (index >= 0) return this.mService[index];
                return this.mService[this.mService.length + index];
        }
        public void setService(int index, Service inp){
            if (this.mService == null) {
                if (index < 0) {
                  this.mService = new Service [1];
                  this.mService[0] = inp;
                } else {
                  this.mService = new Service[index + 1];
                  this.mService[index] = inp;
                }
            } else if (index < 0) {
                        Service [ ] newService = new Service[this.mService.length + 1];
                        java.lang.System.arraycopy((Object)mService, 0, (Object)newService,
0, this.mService.length);
                        newService[newService.length - 1] = inp;
                        mService = newService;
                } else if(index >= this.mService.length){
```

-continued

```
                        Service [ ] newService = new Service[index + 1];
                        java.lang.System.arraycopy((Object)inService, 0, (Object)newService
0, this.mService.length);
                        newService[index] = inp;
                        mService = newService;
                } else {
                        this.mService[index] = inp;
                }
        }
        public void setService(Service [ ] inp) {
                this.mService = inp;
        }
}
```

In addition to the JAVA beans set forth above, transformation code is produced for translating from JAVA to XML and XML to JAVA as set forth below:

Java to XML

<!DOCTYPE tree SYSTEM "tree.dtd">
<tree source="null" pass-through ="false">
<before>
<vardef name="attribute.def">
<element source="ATTRIBUTE" class="NAME" type="5" position="-2">
<parse>
<data class="java.lang.String" position="-2"/>
</parse>
</element>
</vardef>
<vardef name="pcdata.def">
<element source="PCDATA" class="NAME" type="4" position="-2">
<parse>
<data class="999" type="6" position="-2"/>
</parse>
</element>
</vardef>
<vardef name="content.def">
<element source="PCDATA">
<parse>
<data class="999" type="6" position="-2"/>
</parse>
</element>
</vardef>
<vardef name="ServiceSet.var">
<element source="com.veo.xdk.dev.schema.test.blib.ServiceSet" class="service.set" type="4" position="-2">
<parse>
<callvar name="Service.var"/>
</parse>
</element>
</vardef>
<vardef name="PrototypeService.var">
<element source="com.veo.xdk.dev.schema.test.blib.PrototypeService" class="prototype.service" type="4" position="-2">
<parse>
<callvar name="pcdata.def" parms="setSource ServiceNameToXML setGenerator service.name"/>
<callvar name="pcdata.def" parms="setSource ServiceTermsToXML setGenerator service.terms"/>
<callvar name="pcdata.def" parms="setSource ServiceLocationToXML setGenerator service.location"/>
<callvar name="ServiceOperation.var"/>
</parse>
</element>
</vardef>
<vardef name="Service.var">
<element source="com.veo.xdk.dev.schema.test.blib.Service" class="service" type="8" position="0">
<parse>
<callvar name="pcdata.def" parms="setSource ServiceNameToXML setGenerator service.name"/>
<callvar name="pcdata.def" parms="setSource ServiceLocationToXML setGenerator service.location"/>
<callvar name="ServiceOperation.var"/>
<callvar name="pcdata.def" parms="setSource ServiceTermsToXML setGenerator service.terms"/>
</parse>
</element>
</vardef>
<vardef name="ServiceOperation.var">
<element source="com.veo.xdk.dev.schema.test.blib.ServiceOperation" class="service.operation" type="4" position="-2">
<parse>
<callvar name="pcdata.def" parms="setSource ServiceOperationNameToXML setGenerator service.operation.name"/>
<callvar name="pcdata.def" parms="setSource ServiceOperationLocationToXML setGenerator service.operation.location"/>
<callvar name="pcdata.def" parms="setSource ServiceOperationInputToXML setGenerator service.operation.input"/>
<callvar name="pcdata.def" parms="setSource ServiceOperationOutputToXML setGenerator service.operation.output"/>
</parse>
</element>
</vardef>
</before>
<parse>
<callvar name="ServiceSet.var"/>

```xml
<callvar name="PrototypeService.var"/>
<callvar name="Service.var"/>
<callvar name="ServiceOperation.var"/>
</parse>
</tree>
```

XML to Java

```xml
<!DOCTYPE tree SYSTEM "tree.dtd">
<tree source="null" pass-through="false">
<before>
<vardef name="business.var">
<element source="business"
    class="com.veo.xdk.dev.schema.test.blib.Business"
    type="7" setter="setBusiness">
<before>
<onattribute name="business.number">
<actions>
<callmeth name="businessNumberFromXML">
<parms>
<getattr name="business.number"/>
</parms>
</callmeth>
</actions>
</onattribute>
</before>
<parse>
<callvar name="party.name.var" parms="setPosition -1"/>
<callvar name="address.set.var"/>
</parse>
</element>
</vardef>
<vardef name="party.name.var">
<element source="party.name" setter="partyNameFromXML" position="-1" class="java.lang.String">
<parse>
<data class="java.lang.String" position="0">
</parse>
</element>
</vardef>
<vardef name="city.var">
<element source="city" setter="cityFromXML"
    position="-1" class="java.lang.String">
<parse>
<data class="java.lang.String" position="0">
</parse>
</element>
</vardef>
<vardef name="internet.var">
<element source="internet" setter="internetFromXML"
    position="-1" class="java.lang.String">
<parse>
<data class="java.lang.String" position="0"/>
</parse>
</element>
</vardef>
<vardef name="country.var">
<element source="country" setter="countryFromXML"
    position="-1" class="java.lang.String">
<parse>
<data class="java.lang.String" position="0"/>
</parse>
</element>
</vardef>
<vardef name="state.var">
<element source="state" setter="stateFromXML"
    position="-1" class="java.lang.String">
<parse>
<data class="java.lang.String" position="0"/>
</parse>
</element>
</vardef>
<vardef name="email.var">
<element source="email" setter="emailFromXML"
    position="-1" class="java.lang.String">
<parse>
<data class="java.lang.String" position="0"/>
</parse>
</element>
</vardef>
<vardef name="address.physical.var">
<element source="address.physical"
    class="com.veo.xdk.dev.schema.test.blib.AddressPhysical"
    type="7" setter="setAddressPhysical">
<before>
</before>
<parse>
<callvar name="street.var" parms="setPosition -1"/>
<callvar name="city.var" parms="setPosition -1"/>
<callvar name="state.var" parms="setPosition -1"/>
<callvar name="postcode.var" parms="setPosition -1"/>
<callvar name="country.var" parms="setPosition -1"/>
</parse>
</element>
</vardef>
<vardef name="telephone.var">
<element source="telephone" setter="telephoneFromXML" position="-1" class="java.lang.String">
<parse>
<data class="java.lang.String" position="0">
</parse>
</element>
</vardef>
<vardef name="person.var">
<element source="person"
    class="com.veo.xdk.dev.schema.test.blib.Person"
    type="7" setter="setPerson">
<before>
<onattribute name="SSN">
<actions>
<callmeth name="sSNFromXML">
<parms>
<getattr name="SSN"/>
</parms>
```

```xml
</callmeth>
</actions>
</onattribute>
</before>
<parse>
<callvar name="party.name.var" parms="setPosition -1"/>
<callvar name="address.set.var"/>
</parse>
</element>
</vardef>
<vardef name="fax.var">
<element source="fax" setter="faxFromXML" position="-1" class="java.lang.String">
<parse>
<data class="java.lang.String" position="0"/>
</parse>
</element>
</vardef>
<vardef name="street.var">
<element source="street" setter="streetFromXML" position="-1" class="java.lang.String">
<parse>
<data class="java.lang.String" position="0">
</parse>
</element>
</vardef>
<vardef name="address.set.var">
<element source="address.set" class="com.veo.xdk.dev.schema.test.blib.AddressSet" type="7" setter="setAddressSet">
<before>
</before>
<parse>
<callvar name="address.physical.var"/>
<callvar name="telephone.var" parms="setPosition -1"/>
<callvar name="fax.var" parms="setPosition -1">
<callvar name="email.var" parms="setPosition -1"/>
<callvar name="internet.var" parms="setPosition -1"/>
</parse>
</element>
</vardef>
<vardef name="postcode.var">
<element source="postcode" setter="postcodeFromXML" position="-1" class="java.lang.String">
<parse>
<data class="java.lang.String" position="0"/>
</parse>
</element>
</vardef>
<vardef name="market.participant.var">
<element source="market.participant"
    class="com.veo.xdk.dev.schema.test.blib.MarketParticipant"
    type="7" position="0">
<before>
</before>
<parse>
<callvar name="business.var"/>
<callvar name="person.var"/>
</parse>
</element>
</vardef>
</before>
<parse>
<callvar name="business.var"/>
<callvar name="party.name.var"/>
<callvar name="city.var"/>
<callvar name="internet.var"/>
<callvar name="country.var"/>
<callvar name="state.var"/>
<callvar name="email.var"/>
<callvar name="address.physical.var"/>
<callvar name="telephone.var"/>
<callvar name="person.var"/>
<callvar name="fax.var"/>
<callvar name="street.var"/>
<callvar name="address.set.var"/>
<callvar name="postcode.var"/>
<callvar name="market.participant.var"/>
</parse>
</tree>
```

Makefiles:
```

# this makefile was generated by bic version 0.0. May 2, 1998

# get the package name from the package argument passed to SchemaGen
PACKAGE_NAME=com/veo/xdk/dev/schema/test/blib
JAVA_SOURCES +=\
    MarketParticipant.java \
    Business.java \
    Person.java \
    Party.java \
    AddressPhysical.java \
    AddressSet.java \
MAKEFILE_MASTER_DIR=xxx include $(MAKEFILE_MASTER_DIR)/Makefile.master
all:: $(JAVA_CLASSES)

# this makefile was generated by bic version 0.0. May 2, 1998

# get the package name from the package argument passed to SchemaGen
PACKAGE_NAME=com/veo/xdk/dev/schema/test/blib
```

```
JAVA_SOURCES +=\
  ServiceSet.java \
  PrototypeService.java \
  Service.java \
  ServiceOperation.java \
MAKEFILE_MASTER_DIR=xxx
include    $(MAKEFILE_MASTER_DIR)/
  Makefile.master
all:: $(JAVA_CLASSES)
```

Finally, the XML document instances generated at run time according to the model above for one example follows:

```
<!DOCTYPE market.participant SYSTEM "market.par-
    ticipant.dtd">
<market.participant>
<business business.number="1234567890">
<party.name>IBM</party.name>
<address.set>
<address.physical>
<street>1 IBM Way</street>
<city>Palo Alto</city>
<state>CA</state>
<postcode>94304</postcode>
<country>USA</country>
</address.physical>
<telephone>123-456-7890</telephone>
<fax>123 456 0987</fax>
<email>ibmec@ibm.com</email>
</address.set>
</business>
</market.participant>
<!DOCTYPE service SYSTEM "service.dtd">
<service.set>
<service>
<service.name>Order Service</service.name>
<service.location>www.ibm.com/order</
    service.location>
<service.operation>
<service.operation.name>Submit Order</
    service.operation.name>
<service.operation.location>www.ibm.com/order/
    submit</service.location>
<service.operation.input>urn:x-
    ibm:services:order:operations:po.dtd</
    service.operation.input>
<service.operation.output>urn:x-
    ibm:services:order:operations:poack.dtd</
    service.operation.output>
</service.operation>
<service.operation>
<service.operation.name>Track Order</
    service.operation.name>
<service.operation.location>www.ibm.com/order/track</
    service.location>
<service.operation.input>urn:x-
    ibm:services:order:operations:track.irequest.dtd</
    service.operation.input>
<service.operation.output>urn:x-
    ibm:services:order:operations:track.iresponse.dtd</
    service.operation.output>
</service.operation>
</service>
</service.set>
```

Using the tools along with a BID composer application, which provides a drag, drop and forms editing user interface, a developer is able to create a business interface definition and to produce a well formed, valid business interface definition in the form of an XML document. Thus, the example run time instance is a business interface definition for an ordering service for IBM to be used by Ingram Micro and others to order laptop computers from IBM. (There is no relationship between the applicant and IBM or Ingram Micro). Utilizing these processes, a user is able to build a system that allows for programming of a business interface using the documents defined according to the present invention.

The role of CBL and the BID processor of the present invention in an XML/JAVA environment can be further understood by the following explanation of the processing of a Purchase Order.

Company A defines its Purchase Order document type using a visual programming environment that contains a library of CBL DTDs and modules, all defined using common business language elements so that they contain data type and other interpretation information. Company A's PO might just involve minor customizations to a more generic "transaction document" specification that comes with the CBL library, or it might be built from the ground up from CBL modules for address, date and time, currency, etc.

The documentation for the generic "transaction document" specification (such as the transact.dtd set out above) typifies the manner in which CBL specifications are built from modules and are interlinked with other CBL DTDs.

A compiler takes the purchase order definition and generates several different target forms. All of these target forms can be derived through "tree to tree" transformations of the original specification. The most important for this example are:

(a) the XML DTD for the purchase order.

(b) a JAVA Bean that encapsulates the data structures for a purchase order (the JAVA classes, arguments, datatypes, methods, and exception structures are created that correspond to information in the Schema definition of the purchase order).

(c) A "marshaling" program that converts purchase orders that conform to the Purchase Order DTD into a Purchase Order JAVA Bean or loads them into a database, or creates HTML (or an XSL style sheet) for displaying purchase orders in a browser.

(d) An "unmarshaling" program that extracts the data values from Purchase Order JAVA Beans and converts them into an XML document that conforms to the Purchase Order DTD.

Now, back to the scenario. A purchasing application generates a Purchase Order that conforms to the DTD specified as the service interface for a supplier who accepts purchase orders.

The parser uses the purchase order DTD to decompose the purchase order instance into a stream of information about the elements and attribute values it contains. These "property sets" are then transformed into corresponding JAVA event objects by wrapping them with JAVA code. This transformation in effect treats the pieces of marked-up XML document as instructions in a custom programming language whose grammar is defined by the DTD. These JAVA events can now be processed by the marshaling applications generated by the compiler to "load" JAVA Bean data structures.

Turning the XML document into a set of events for JAVA applications to process, is unlike the normal model of parsing in which the parser output is maintained as an internal data structure and processing does not begin until parsing completes. The event based processing, in response to the BID definitions, is the key to enabling the much richer functionality of the processor because it allows concurrent document application processing to begin as soon as the first event is emitted.

JAVA programs that "listen for" events of various types are generated from the Schema definition of those events. These listeners are programs created to carry out the business logic associated with the XML definitions in the CBL; for example, associated with an "address" element may be code that validates the postal code by checking a database. These listeners "subscribe" to events by registering with the document router, which directs the relevant events to all the subscribers who are interested in them.

This publish and subscribe architecture means that new listener programs can be added without knowledge by or impact on existing ones. Each listener has a queue into which the router directs its events, which enables multiple listeners can handle events in parallel at their own pace.

For the example purchase order here, there might be listeners for:

the purchase order, which would connect it to an order entry program, product descriptions, which might check inventory, address information, which could check Fed Ex or other service for delivery availability, buyer information, which could check order history (for creditworthiness, or to offer a promotion, or similar processing based on knowing who the customer is).

Complex listeners can be created as configurations of primitive ones (e.g., a purchase order listener may contain and invoke these listeners here, or they may be invoked on their own).

Figure 11:
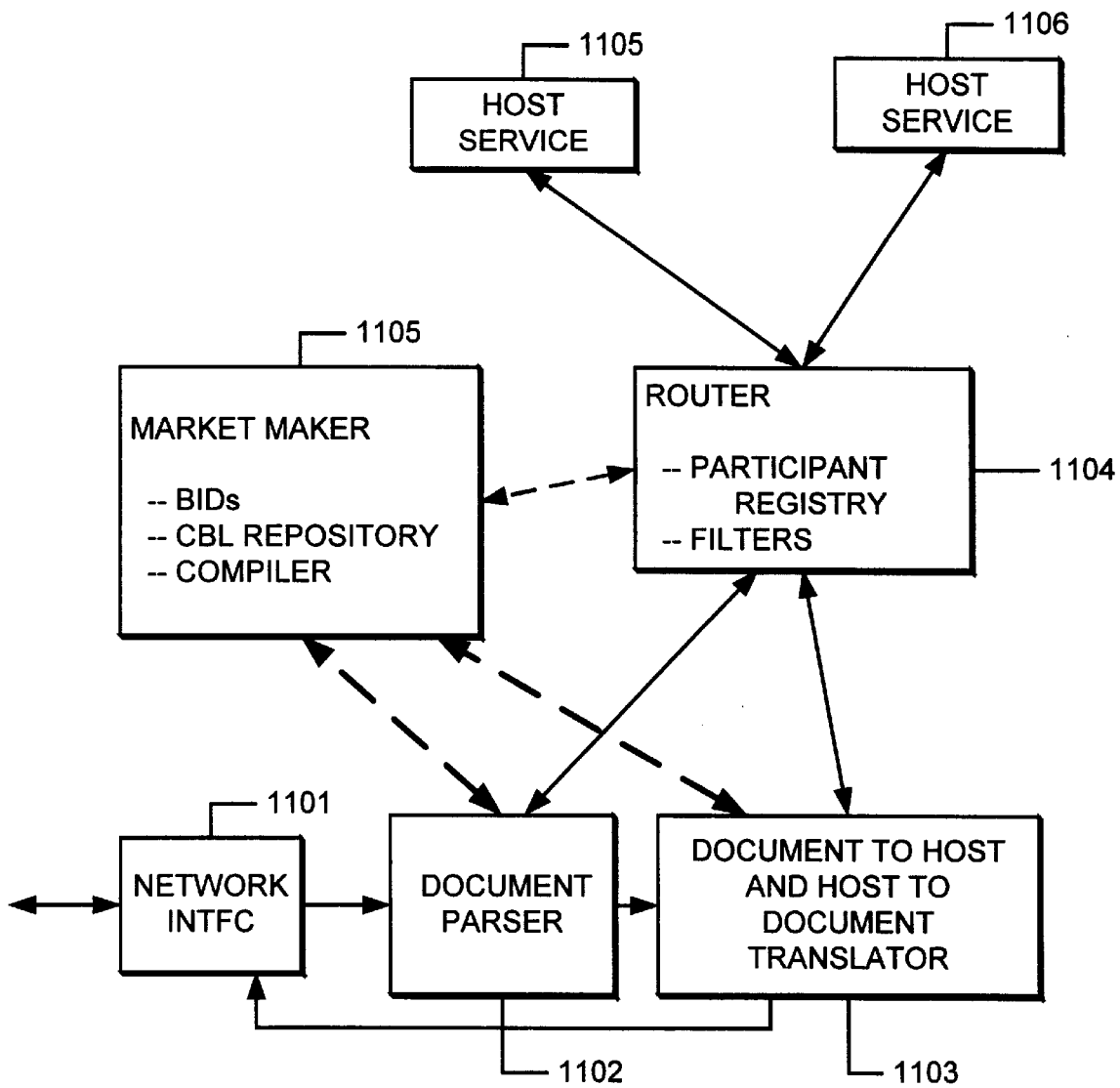
FIG. 11 is a simplified diagram of the resources at a server providing the market maker function for the network of the present invention based on business interface definitions.

FIG. 11 illustrates the market maker node in the network of FIG. 1. The market maker node includes the basic structures of the system of FIG. 3, including a network interface 1101, a document parser 1102, a document to host and host to document translator 1103, and a front end 1104, referred to as a router in this example. The market maker module 1105 in this example includes a set of business interface definitions, or other identifiers sufficient to support the market maker function, for participants in the market, a CBL repository, and a compiler all serving the participants in the market. The router 1104 includes a participant registry and document filters which respond to the events generated at the output of the translator and by the parser to route incoming documents according to the participant registry and according to the element and attribute filters amongst the listeners to the XML event generators. Thus, certain participants in the market may register to receive documents that meet prespecified parameters. For example, input documents according to a particular DTD, and including an attribute such as numbers of products to be purchased greater than a threshold, or such as a maximum price of a document request to be purchased, can be used to filter documents at the router 1104. Only such documents as match the information registered in the participant registry at the router 1104 are then passed on to the registered participant.

The router 1104 may also serve local host services 1105 and 1106, and as such act as a participant in the market as well as the market maker. Typically, documents that are received by the router 1104 are traversed to determine the destinations to which such documents should be routed, there again passed back through the translator 1103, if necessary, and out the network interface 1101 to the respective destinations.

The market maker is a server that binds together a set of internal and external business services to create a virtual enterprise or trading community. The server parses incoming documents and invokes the appropriate services by, for example, handing off a request for product data to a catalog server or forwarding a purchase order to an ERP system. The server also handles translation tasks, mapping the information from a company's XML documents onto document formats used by trading partners and into data formats required by its legacy systems.

With respect to the service definition above, when a company submits a purchase order, the XML parser in the server uses the purchase order DTD to transform the purchase order instance into a stream of information events. These events are then routed to any application that is programmed to handle events of a given type; in some cases, the information is forwarded over the Internet to a different business entirely. In the purchase order example, several applications may act on information coming from the parser:

An order entry program processes the purchase order as a complete message;

An ERP system checks inventory for the products described in the purchase order;

A customer database verifies or updates the customer's address;

A shipping company uses the address information to schedule a delivery

A bank uses the credit card information to authorize the transaction.

Trading partners need only agree on the structure, content, and sequencing of the business documents they exchange, not on the details of APIs. How a document is processed and what actions result is strictly up to the business providing the service. This elevates integration from the system level to the business level. It enables a business to present a clean and stable interface to its business partners despite changes in its internal technology implementation, organization, or processes.

Figure 12:
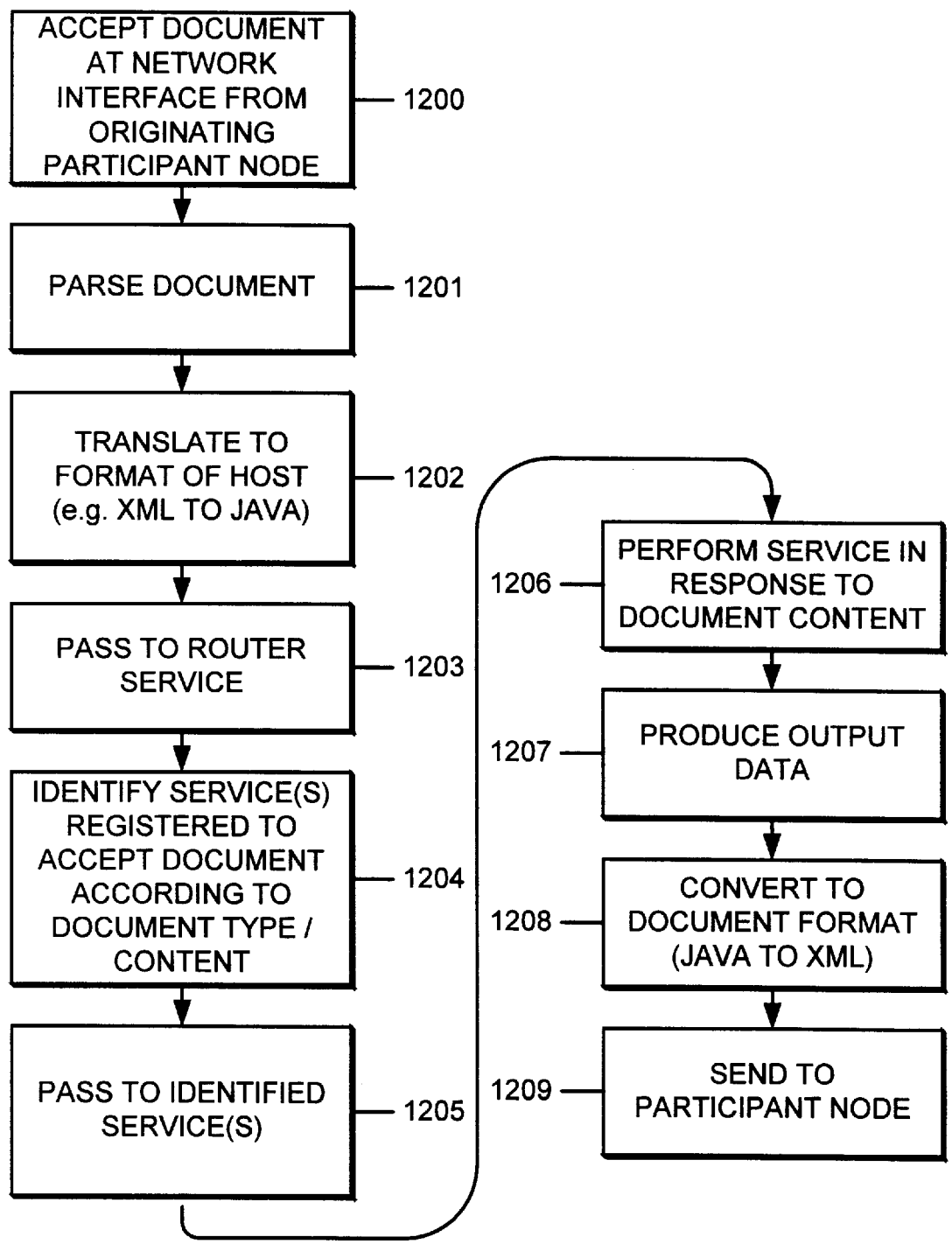
FIG. 12 is a flow chart for the market maker node processing of a received document.
Figure 13:
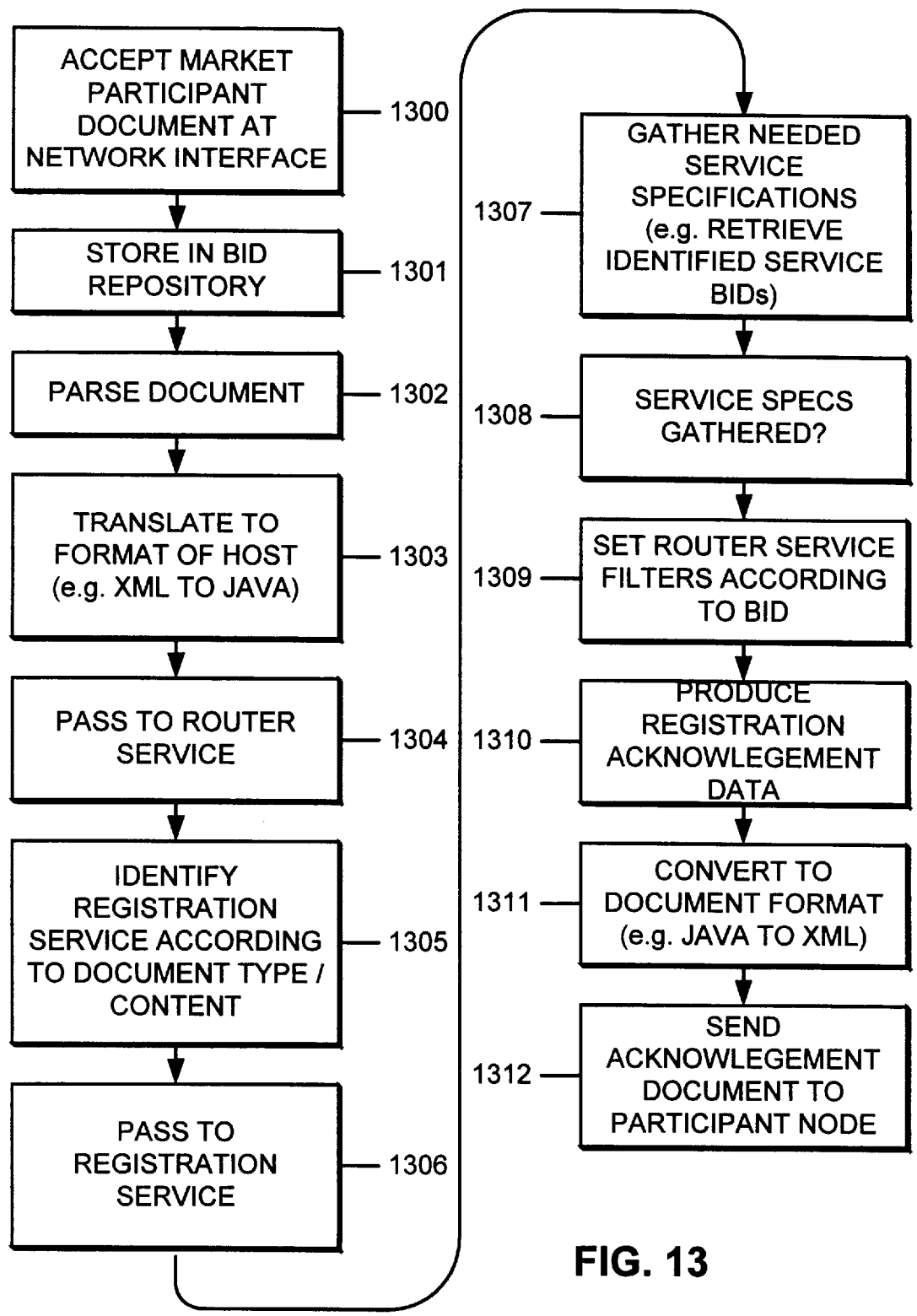
FIG. 13 is a flow chart illustrating the process of registering participants at a market maker node according to the present invention.
Figure 14:
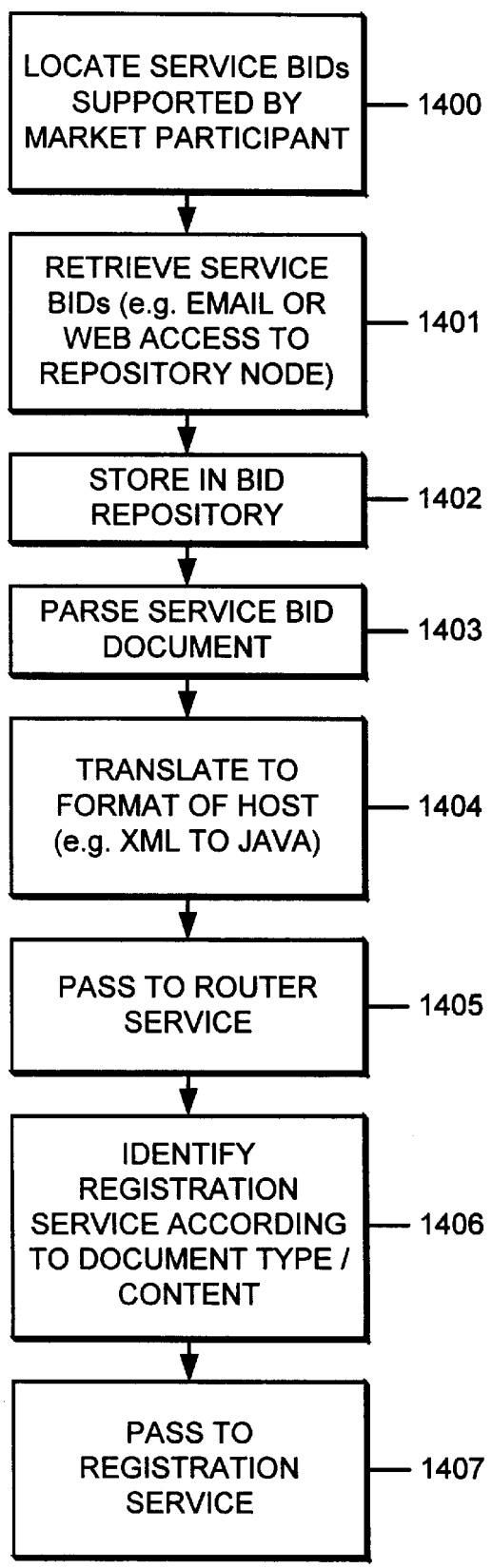
FIG. 14 is a flow chart illustrating the process of providing service specifications at a market maker node according to the process of FIG. 9.

FIGS. 12, 13 and 14 illustrate processes executed at a market maker node in the system of FIG. 11. In FIG. 12, an input document is received at the network interface from an originating participant node (step 1200). The document is parsed (step 1201). The document is translated to the format of the host, for example XML to JAVA (step 1202). The host formatted events and objects are then passed to the router service (step 1203). The services registered to accept the document according to the document type and content of the document are identified (step 1204). The document or a portion of the document is passed to the identified services (step 1205). As service is performed in response to the document content (step 1206). The output data of the service is produced (step 1207). The output is converted to the document format, for example from a JAVA format to an XML format (step 1208). Finally, the output document is sent to a participant node (step 1209).

The registration service is one such function which is managed by the router. Thus, a market participant document is accepted at the network interface as shown in FIG. 13 (step 1300). The market participant document is stored in the business interface definition repository (step 1301) for the market maker node. In addition, the document is parsed (step 1302). The parsed document is translated into the format of the host (step 1303). Next, the document is passed to the router service (step 1304). The router service includes a listener which identifies the registration service as the destination of the document according to the document type and content (step 1305). The document or elements of the document are passed to the registration service (step 1306). In the registration service, the needed service specifications are retrieved according to the business interface definition (step 1307). If the service specifications are gathered, at step 1308, the router service filters are set according to the business interface definition and the service specifications (step 1309). Registration acknowledgment data is produced (1310). The registration acknowledgment data is converted to a document format (step 1311). Finally, the acknowledgment document is sent to the participant node indicating to the participant that is successfully registered with the market maker (step 1312).

The process at step 1307 of gathering needed service specifications is illustrated for one example in FIG. 14. This process begins by locating a service business interface definition supported by the market participant (step 1400). The service definition is retrieved, for example by an E-mail transaction or web access to repository node (step 1401). The service specification is stored in the BID repository (step 1402). The service business interface definition document is parsed (step 1403). The parsed document is translated into the format of the host (step 1404). Host objects are passed to the router service (step 1405). The registration service is identified according to the document type and content (step 1406). Finally, the information in the service business interface definition document is passed to the registration service (step 1407) for use according to the process of FIG. 13.

Figure 15:
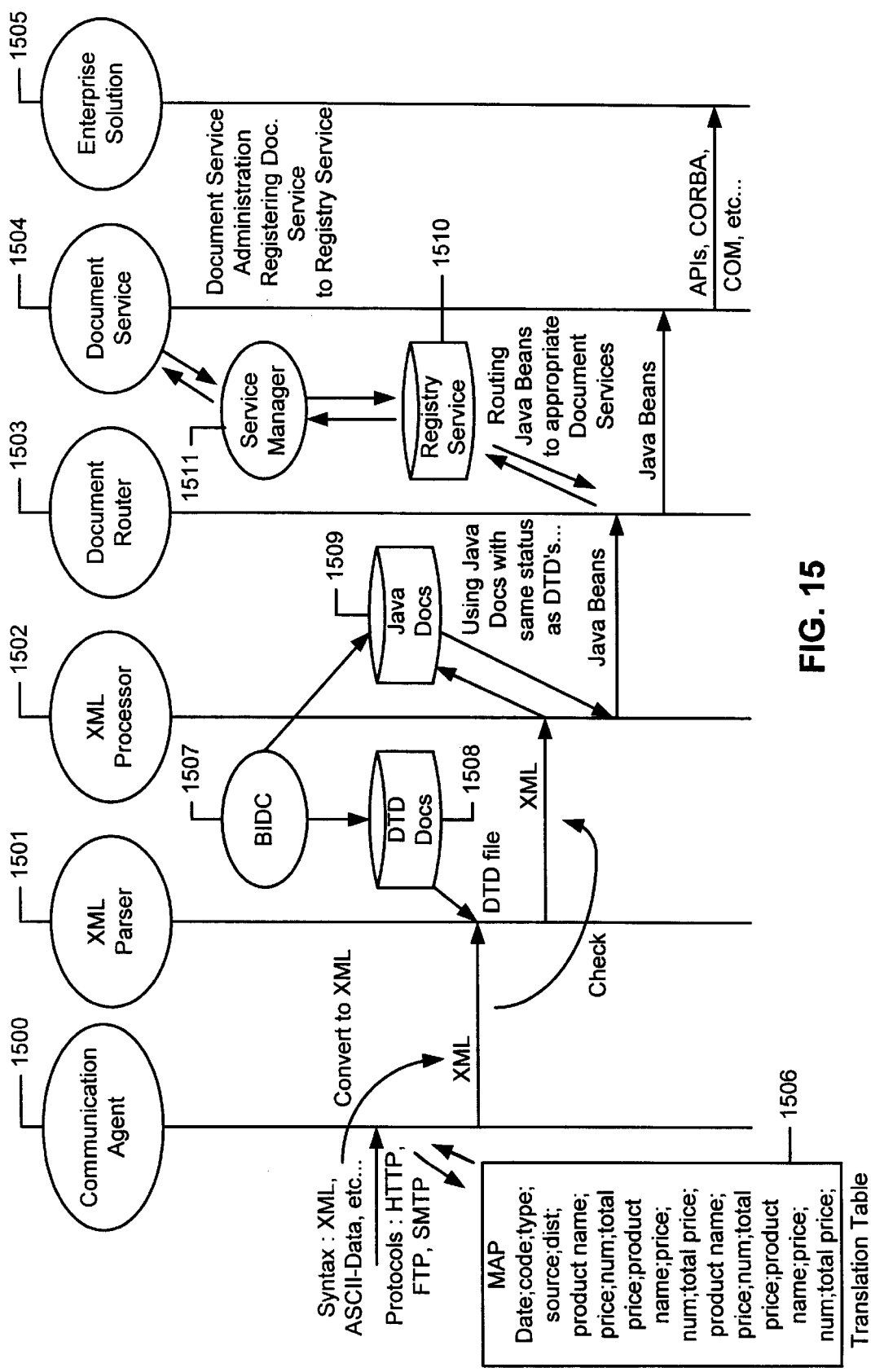
FIG. 15 is a diagram illustrating the sequence of operation at a participant or market maker node according to the present invention.

FIG. 15 illustrates the processor, components and sequence of processing of incoming data at market maker node according to the present invention. The market maker node includes a communication agent 1500 at the network interface. The communication agent is coupled with an XML parser 1501 which supplies events to an XML processor 1502. The XML processor supplies events to a document router. The document router feeds a document service 1504 that provides an interface for supplying the received documents to the enterprise solution software 1505 in the host system. The communication agent 1500 is an Internet interface which includes appropriate protocol stacks supporting such protocols as HTTP, SMTP, FTP, or other protocols. Thus, the incoming data could come in an XML syntax, an ASCII data syntax or other syntax as suits a particular communication channel. All the documents received in non-XML syntaxes are translated into XML and passed the XM4L parser. A translation table 1506 is used to support the translation from non-XML form into XML form.

The converted documents are supplied to the parser 1501. The XML parser parses the received XML document according to the document type definition which matches it. If an error is found, then the parser sends the document back to the communication agent 1500. A business interface definition compiler BIDC 1507 acts as a compiler for business interface definition data. The DTD file for the XML parser, JAVA beans corresponding to the DTD file, and translation rules for translating DTD files to JAVA beans are created by compiling the BID data. An XML instance is translated to JAVA instance by referring to these tools. Thus the BID compiler 1507 stores the DTD documents 1508 and produces JAVA documents which correspond 1509. The XML documents are passed to the processor 1502 which translates them into the JAVA format. In a preferred system, JAVA documents which have the same status as the document type definitions received in the XML format are produced. The JAVA beans are passed to the document router 1503. The document router 1503 receives the JAVA beans and passes the received class to the appropriate document service using a registry program, for example using the event listener architecture described above. The document service 1504 which receives the document in the form of JAVA beans from the router 1503 acts as the interface to the enterprise solution software. This includes a registry service 1510 by which listeners to XML events are coupled with the incoming data streams, and a service manager 1511 to manage the routing of the incoming documents to the appropriate services. The document service manager 1511 provides for administration of the registry service and for maintaining document consistency and the like.

The document service communicates with the back end system using any proprietary API, or using such more common forms as the CORBA/COM interface or other architectures.

Figure 16:
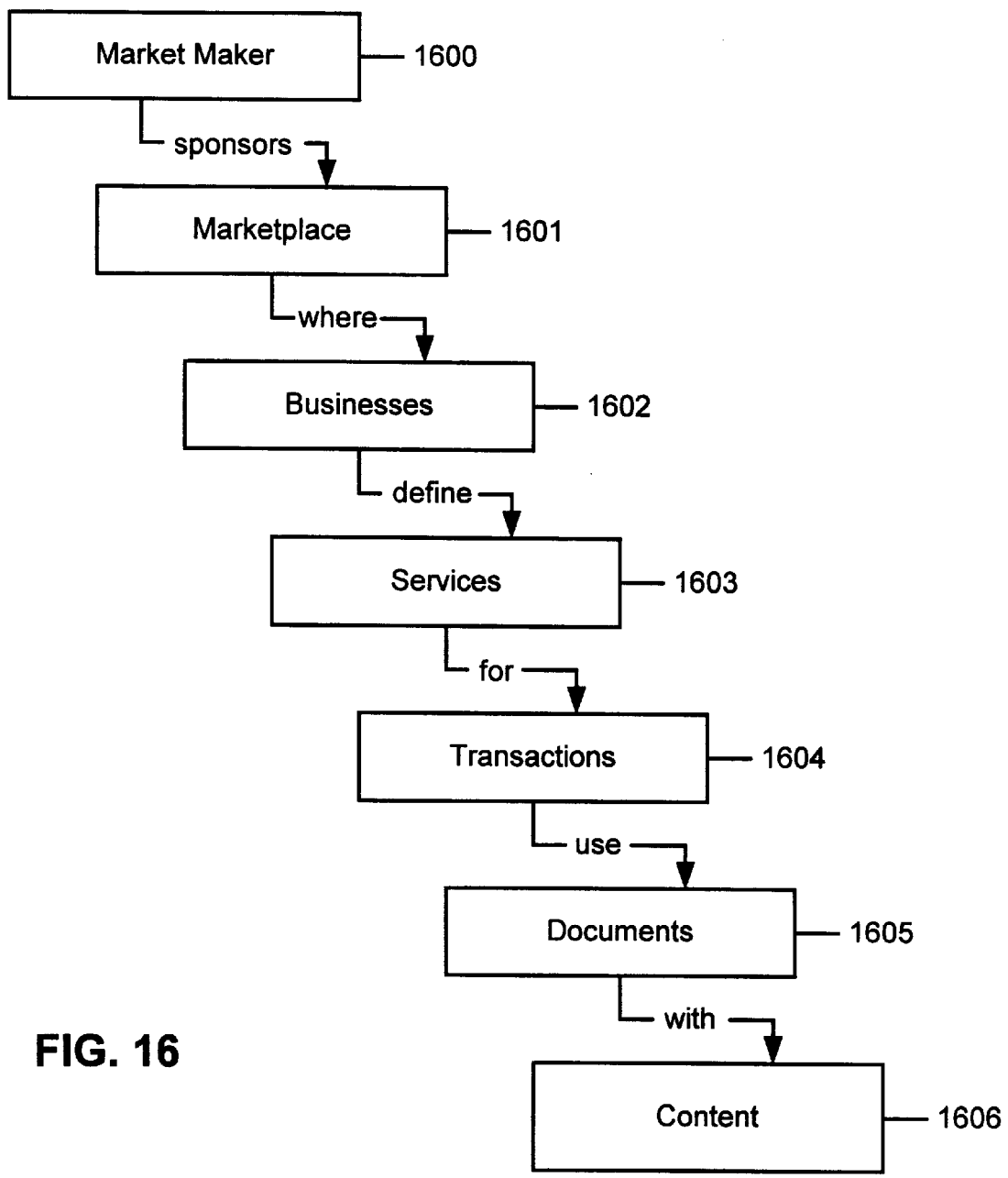
FIG. 16 is a conceptual diagram of the elements of a commercial network based on BIDs, according to the present invention.

FIG. 16 provides a heuristic diagram of the market maker and market participant structures according to the present invention. Thus, the electronic commerce market according to the present invention can be logically organized as set forth in FIG. 16. At the top of the organization, a market maker node 1600 is established. The market maker node includes resources that establish a marketplace 1601. Such resources include a market registry service and the like. Businesses 1602 register in the marketplace 1601 by publishing a business interface definition. The business interface definition defines the services 1603 for commercial transactions in which the businesses will participate. The transactions 1604 and services 1603 use documents 1605 to define the inputs and outputs, and outline the commercial relationship between participants in the transaction. The documents have content 1606 which carries the particulars of each transaction. The manner in which the content is processed by the participants in the market, and by the market maker is completely independent of the document based electronic commerce network which is established according to the present invention. Overall, a robust, scalable, intuitive structure is presented for enabling electronic commerce on communication networks is provided.

Thus, the present invention in an exemplary system provides a platform based on the XML processor and uses XML documents as the interface between loosely coupled business systems. The documents are transferred between businesses and processed by participant nodes before entering the company business system. Thus the platform enables electronic commerce applications between businesses where each business system operates using different internal commerce platforms, processes and semantics, by specifying a common set of business documents and forms.

According to the present invention, virtual enterprises are created by interconnecting business systems and service, are primarily defined in terms of the documents (XML-encoded) that businesses accept and generate:

"if you send me a request for a catalog, I will send you a catalog:

"if you send me a purchase order and I can accept it, I will send you an invoice".

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for executing transactions among nodes in a network including a plurality of nodes which execute processes involved in the transactions, comprising:

storing a machine-readable specification of an interface for a transaction, the specification including a definition of an input document, and a definition of an output document, the definitions of the input and output documents comprising respective descriptions of sets of storage units and logical structures for the sets of storage units;

receiving data comprising a document through a communication network;

parsing the document according to the specification to identify an input document;

providing at least a portion of the input document in a machine-readable format to a transaction process which produces an output;

forming, based on the specification, an output document comprising the output according to the definition of an output document; and transmitting the output document on the communication network.

2. The method of claim 1, including:

accessing a specification of a complementary interface provided for another node in the network for the transaction, the accessed specification including a definition of an input document for the complementary interface, and a definition of an output document for the complementary interface; and establishing the stored specification of the interface by including at least part of the definition of the output document of the complementary interface in the definition of the input document of the interface in the stored specification.

3. The method of claim 2, including:

finding the complementary interface in the network.

4. The method of claim 2, wherein the establishing the stored specification includes accessing elements of the machine-readable specification from a repository, the repository storing a library of logical structures, schematic maps for logic structures, and definitions of documents comprising logic structures used to build interface descriptions.

5. The method of claim 2, including:

establishing the stored specification of the interface by including at least part of the definition of the input document of the complementary interface in the definition of the output document of the interface in the stored specification.

6. The method of claim 1, including providing access to the specification through the communication network to other nodes in the network.

7. The method of claim 1, including sending the specification of the interface to another node in the network, at which access to the specification is provided for other nodes in the network.

8. The method of claim 1, wherein the machine-readable specification includes a document compliant with a definition of an interface document including logical structures for storing an identifier of a particular transaction, and at least one of definitions and references to definitions of input and output documents for the particular transaction.

9. The method of claim 1, wherein the machine-readable specification includes a document compliant with a definition of an interface document including logical structures for storing an identifier of the interface, and for storing at least one of specifications and references to specifications of a set of one or more transactions supported by the interface.

10. The method of claim 9, wherein the machine-readable specification includes a reference to a specification of a particular transaction, and the specification of the particular transaction includes a document including logical structures for storing at least one of definitions and references to definitions of input and output documents for the particular transaction.

11. The method of claim 1, wherein the storage units comprise parsed data.

12. The method of claim 11, wherein the parsed data in at least one of the input and output documents comprises:

character data encoding text characters in the one of the input and output documents, and markup data identifying sets of storage units according to the logical structure of the one of the input and output documents.

13. The method of claim 12, wherein at least one of the sets of storage units encodes a plurality of text characters providing a natural language word.

14. The method of claim 11, wherein the specification includes interpretation information for at least one of the sets of storage units identified by the logical structure of at least one of the input and output documents, encoding respective definitions for sets of parsed characters.

15. The method of claim 11, wherein the storage units comprise unparsed data.

16. The method of claim 1, wherein the transaction process has a variant transaction processing architecture, and including translating at least of portion of the input document into a format readable according to the variant transaction processing architecture of the transaction process.

17. The method of claim 16, wherein the translating includes producing programming objects including variables and methods according to the variant transaction processing architecture of the transaction process.

18. The method of claim 16, wherein the variant transaction processing architecture of the transaction process includes a process compliant with an interface description language.

19. The method of claim 1, wherein the definitions of the input and output documents comprise document type definitions compliant with a standard Extensible Markup Language XML.

20. The method of claim 1, including providing a repository of document types for use in a plurality of transactions, and wherein the definition of one of the input and output documents includes a reference to a document type in the repository.

21. The method of claim 20, wherein the repository of document types includes a document type for identifying participant processes in the network.

22. The method of claim 20, including providing a repository of interpretation information for logical structures, including interpretation information identifying parameters of transactions.

23. The method of claim 1, wherein the transaction process has variant transaction processing architecture, and including:

accessing a specification of a complementary interface, the accessed specification including a definition of an input document for the complementary interface, and a definition of an output document for the complementary interface;

establishing the stored specification of the interface by including the definition of the output document of the complementary interface as the definition of the input document of the interface in the stored specification; and compiling in response to the definitions of the input and output documents, data structures corresponding to the sets of storage units and logical structures of the input and output documents compliant with the transaction processing architecture of the transaction process, instructions executable by the system to translate the input document to the corresponding data structures, and instructions executable by the system to translate output of the transaction process into a form compliant with the definition of the output document.

24. The method of claim 23, including:

establishing the stored specification of the interface by including the definition of the input document of the complementary interface as the definition of the output document of the interface in the stored specification.

25. The method of claim 1, wherein the transaction process has a variant transaction processing architecture, and wherein the establishing the stored specification includes accessing elements of the machine-readable specification from a repository, the repository storing a library of logical structures, schematic maps for logical structures, and definitions of documents comprising logical structures used to build interface descriptions; and including compiling in response to the definitions of the input and output documents, data structures corresponding to the sets of storage units and logical structures of the input and output documents compliant with the transaction processing architecture of the transaction process, instructions executable by the system to translate the input document to the corresponding data structures, and instructions executable by the system to translate output of the transaction process into a form compliant with the definition of the output document.

26. Apparatus for managing transactions among nodes in a network including a plurality of nodes which execute processes involved in the transactions, comprising:

a network interface;

memory storing data and programs of instructions, including a machine-readable specification of an interface for a transaction, the specification including a definition of an input document, and a definition of an output document, the definitions of the input and output documents comprising respective descriptions of sets of storage units and logical structures for the sets of storage units;

a data processor coupled to the memory and the network interface which executes the programs of instructions;

wherein the programs of instructions include logic to receive data comprising a document through a network interface;

logic to parse the document according to the specification to identify an input document;

logic to provide at least a portion of the input document in a machine-readable format to a transaction process which produces an output;

logic to form, based on the specification, an output document comprising the output according to the definition of an output document; and logic to transmit the output document on the network interface.

27. The apparatus of claim 26, including:

logic to access a specification of a complementary interface, the accessed specification including a definition of an input document for the complementary interface, and a definition of an output document for the complementary interface; and logic to establish the stored specification of the interface by including the definition of the output document of the complementary interface as the definition of the input document of the interface in the stored specification.

28. The apparatus of claim 27, wherein the logic to establish the stored specification includes logic to access elements of the machine-readable specification from a repository, the repository storing a library of logical structures, schematic maps for logic structures, and definitions of documents comprising logic structures used to build interface descriptions.

29. The apparatus of claim 27, including:

logic to establish the stored specification of the interface by including the definition of the input document of the complementary interface as the definition of the output document of the interface in the stored specification.

30. The apparatus of claim 26, including logic to provide access to the specification through the network interface to other nodes in the network.

31. The apparatus of claim 26, including logic to send the specification of the interface to another node in the network, at which access to the specification is provided for other nodes in the network.

32. The apparatus of claim 26, wherein the machine-readable specification includes a document compliant with a definition of an interface document including logical structures for storing an identifier of a particular transaction, and at least one of definitions and references to definitions of input and output documents for the particular transaction.

33. The apparatus of claim 26, wherein the machine-readable specification includes a document compliant with a definition of an interface document including logical structures for storing an identifier of the interface, and for storing at least one of specifications and references to specifications of a set of one or more transactions supported by the interface.

34. The apparatus of claim 33, wherein the machine-readable specification includes a reference to a specification of a particular transaction, and the specification of the particular transaction includes a document including logical structures for storing at least one of definitions and references to definitions of input and output documents for the particular transaction.

35. The apparatus of claim 26, wherein the storage units comprise parsed data.

36. The apparatus of claim 35, wherein the parsed data in at least one of the input and output documents comprises:

character data encoding text characters in the one of the input and output documents, and markup data identifying sets of storage units according to the logical structure of the one of the input and output documents.

37. The apparatus of claim 36, wherein at least one of the sets of storage units encodes a plurality of text characters providing a natural language word.

38. The apparatus of claim 35, wherein the specification includes interpretation information for at least one of the sets of storage units identified by the logical structure of at least one of the input and output documents, encoding respective definitions for sets of parsed characters.

39. The apparatus of claim 35, wherein the storage units comprise unparsed data.

40. The apparatus of claim 26, wherein the transaction process has variant transaction processing architecture, and including logic to translate at least of portion of the input document into a format readable according to the variant transaction processing architecture of the transaction process.

41. The apparatus of claim 40, wherein the logic to translate includes logic to produce programming objects including variables and methods according to the variant transaction processing architecture of the transaction process.

42. The apparatus of claim 40, wherein the variant transaction processing architecture of the transaction process includes a process compliant with an interface description language.

43. The apparatus of claim 26, wherein the definitions of the input and output documents comprise document type definitions compliant with a standard Extensible Markup Language XML.

44. The apparatus of claim 26, including memory accessible by the processor storing a repository of document types for use in a plurality of transactions, and wherein the definition of one of the input and output documents includes a reference to a document type in the repository.

45. The apparatus of claim 44, wherein the repository of document types includes a document type for identifying participant processes in the network.

46. The apparatus of claim 44, including providing a repository of interpretation information for logical structures, including interpretation information identifying parameters of transactions.

47. The apparatus of claim 26, wherein the transaction process has variant transaction processing architecture, and including:

logic to access a specification of a complementary interface, the accessed specification including a definition of an input document for the complementary interface, and a definition of an output document for the complementary interface;

logic to establish the stored specification of the interface by including the definition of the output document of the complementary interface as the definition of the input document of the interface in the stored specification; and logic to compile in response to the definitions of the input and output documents, data structures corresponding to the sets of storage units and logical structures of the input and output documents compliant with the transaction processing architecture of the transaction process, to compile instructions executable by the system to translate the input document to the corresponding data structures, and to compile instructions executable by the system to translate output of the transaction process into a form compliant with the definition of the output document.

48. The apparatus of claim 47, including:

logic to establish the stored specification of the interface by including the definition of the input document of the complementary interface as the definition of the output document of the interface in the stored specification.

49. The apparatus of claim 26, wherein the transaction process has a variant transaction processing architecture, and including logic to establish the stored specification by accessing elements of the machine-readable specification from a repository, the repository storing a library of logical structures, schematic maps for logical structures, and definitions of documents comprising logical structures used to build interface descriptions; and including logic to compile in response to the definitions of the input and output documents, data structures corresponding to the sets of storage units and logical structures of the input and output documents compliant with the transaction processing architecture of the transaction process, to compile instructions executable by the system to translate the input document to the corresponding data structures, and to compile instructions executable by the system to translate output of the transaction process into a form compliant with the definition of the output document.

* * * * *